(12) United States Patent
Tollefson et al.

(10) Patent No.: US 9,352,679 B2
(45) Date of Patent: May 31, 2016

(54) FROZEN CONFECTION KIOSK AND LIQUID-DISPENSING ASSEMBLY FOR USE THEREWITH

(75) Inventors: Brian J. Tollefson, Boca Raton, FL (US); David S. Tollefson, Boca Raton, FL (US)

(73) Assignee: Tikiz Franchising, LLC, Boca Raton, FL (US)

( * ) Notice: Subject to any disclaimer, the term of this patent is extended or adjusted under 35 U.S.C. 154(b) by 95 days.

(21) Appl. No.: 13/559,664

(22) Filed: Jul. 27, 2012

(65) Prior Publication Data

US 2014/0027471 A1     Jan. 30, 2014

(51) Int. Cl.
*B60P 3/025*     (2006.01)

(52) U.S. Cl.
CPC ................... *B60P 3/0257* (2013.01)

(58) Field of Classification Search
CPC .. B60P 3/0257; B60P 3/0255; A01M 7/0075; B60R 9/06
USPC .............. 222/146.6, 144, 132, 608–610, 526, 222/538; 296/22, 24.36, 26.09, 65.07; 239/164; 62/239, 390
See application file for complete search history.

(56) References Cited

U.S. PATENT DOCUMENTS

| | | | |
|---|---|---|---|
| 184,292 A | 11/1876 | Matthews | |
| 1,327,248 A * | 1/1920 | Moody | ........................... 296/21 |
| 2,733,094 A | 1/1956 | Carlton | |
| 2,982,578 A | 5/1956 | Lowe | |
| 3,191,400 A | 6/1965 | Swenson | |
| 3,395,503 A * | 8/1968 | Grenburg et al. | ................ 52/114 |
| 3,476,295 A | 11/1969 | Telfer | |
| 3,887,132 A | 6/1975 | Widmer | |
| 4,076,349 A | 2/1978 | Gettleman et al. | |
| 4,089,554 A * | 5/1978 | Myers | ........................... 296/37.1 |
| 4,225,059 A | 9/1980 | Kappos | |
| 4,288,034 A * | 9/1981 | Widmer et al. | ................ 239/168 |
| 4,359,073 A | 11/1982 | de Stoutz | |

(Continued)

FOREIGN PATENT DOCUMENTS

| | | |
|---|---|---|
| CA | 2357142 | 3/2003 |
| DE | 9405207 | 5/1994 |
| DE | 29506844 | 6/1995 |

OTHER PUBLICATIONS

"Car Wash Equipment." by Martin Mobile Fleet Wash Systems. N.p., n.d. Web Jan. 31, 2014. <http://www.hotfrog.com/Companies/Martin-Mobile-Fleet-wash-Systems/car-wash-equipment-236538>.

(Continued)

*Primary Examiner* — Paul R Durand
*Assistant Examiner* — Charles P Cheyney
(74) *Attorney, Agent, or Firm* — Sand & Sebolt

(57) ABSTRACT

A kiosk for selling frozen confections such as shaved ice or ice cream is provided with a liquid-topping dispenser assembly having liquid-dispensing faucets which are operable by a customer outside the kiosk to dispense liquid toppings onto the frozen confections. The dispenser assembly may be configured to allow people to operate faucets from both sides of the dispenser assembly. The dispenser assembly extends outwardly of the kiosk in a dispensing orientation and is movable to a stored orientation. The dispenser assembly may also be movable between several dispensing positions. The kiosk may be stationary or mobile. The kiosk may be provided with more than one dispenser assembly and may use a dispenser assembly mounted on a trailer.

27 Claims, 10 Drawing Sheets

(56) References Cited

U.S. PATENT DOCUMENTS

| | | | | |
|---|---|---|---|---|
| 4,375,306 A | * | 3/1983 | Linder | 312/249.9 |
| 4,456,149 A | | 6/1984 | Sciortino | |
| 5,154,317 A | | 10/1992 | Roppolo, III | |
| 5,307,957 A | | 5/1994 | Carlsson et al. | |
| 5,375,767 A | * | 12/1994 | Thorstensson | 239/164 |
| 5,452,825 A | | 9/1995 | Comstock et al. | |
| 5,564,597 A | | 10/1996 | Koorse et al. | |
| 5,711,073 A | * | 1/1998 | Tippmann et al. | 29/897.2 |
| 6,189,944 B1 | | 2/2001 | Piche | |
| 6,701,913 B1 | * | 3/2004 | LeDuc et al. | 126/276 |
| 6,814,383 B2 | * | 11/2004 | Reed et al. | 296/24.3 |
| 7,044,335 B2 | | 5/2006 | Aguirre et al. | |
| 7,152,812 B1 | * | 12/2006 | Johnson | 239/164 |
| 7,364,050 B2 | * | 4/2008 | Guard | 221/131 |
| 7,413,132 B1 | * | 8/2008 | Bogart et al. | 239/169 |
| D580,071 S | * | 11/2008 | Evans et al. | D25/10 |
| 7,591,404 B2 | * | 9/2009 | LeDuc et al. | 224/509 |
| 7,669,740 B2 | * | 3/2010 | Saunders et al. | 222/608 |
| D633,007 S | * | 2/2011 | Evans | D12/83 |
| 8,157,136 B2 | | 4/2012 | Lamb et al. | |
| 2004/0256872 A1 | * | 12/2004 | Piper et al. | 296/24.36 |
| 2014/0239020 A1 | * | 8/2014 | Lamb | 222/610 |

OTHER PUBLICATIONS

Excalabar Staircase Offroad Camper Trailer, http://web.archive.org/web20120802023441/http://www.jimboombacampertrailers.com.au/product/2224/Excalabar-Staircase-Offroad-Camper-Trailer, 3 pages, Archived Aug. 2, 2012.
Jimboomba Camper Trailers, Trailer Optional Extra's, http://web.archive.org/web/20120907015647/http://www.jimboombacampertrailers.com.au/product/2226/Trailer-Optional-Extras, 5 pages, Archived Sep. 7, 2012.

* cited by examiner

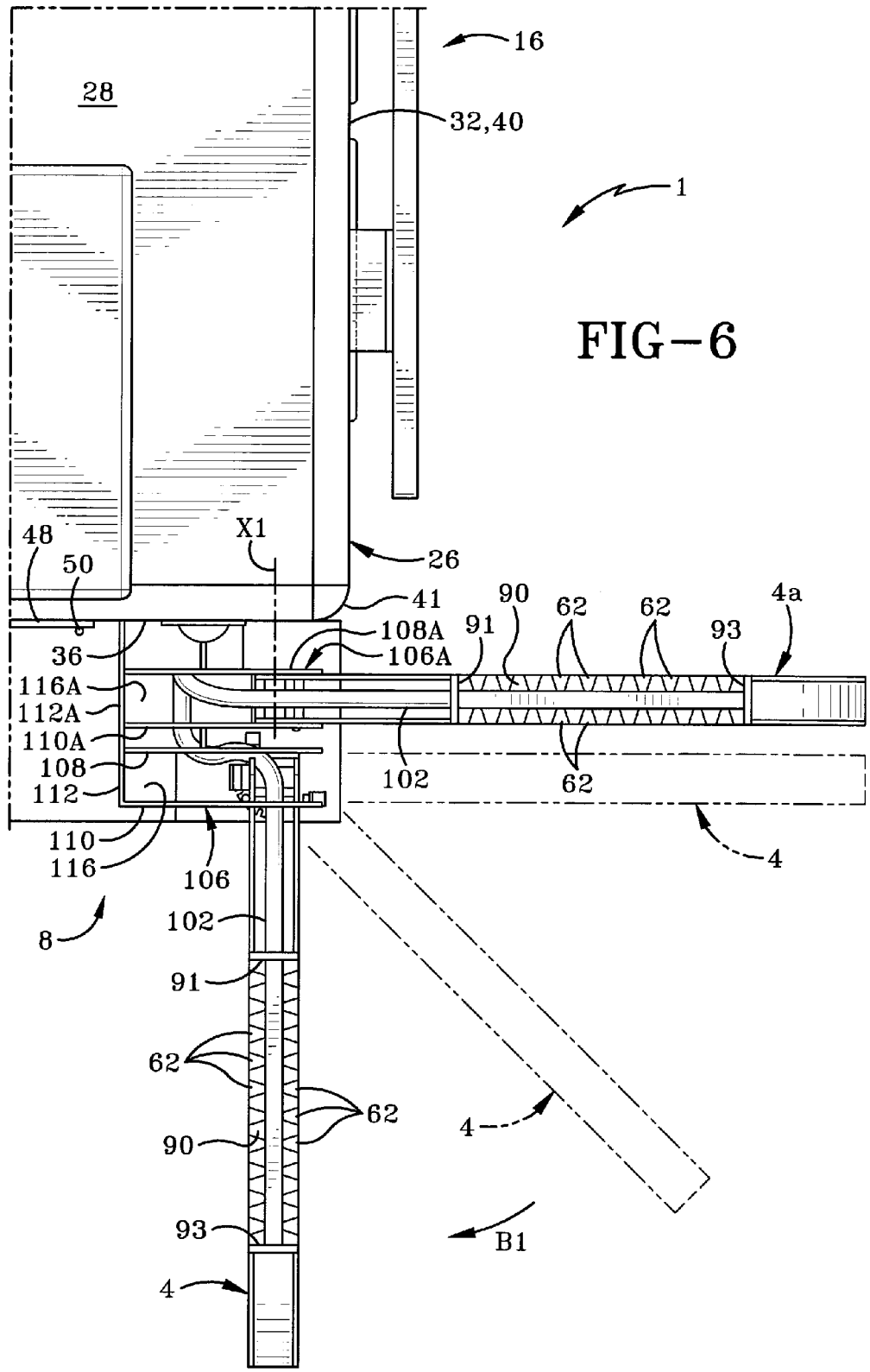

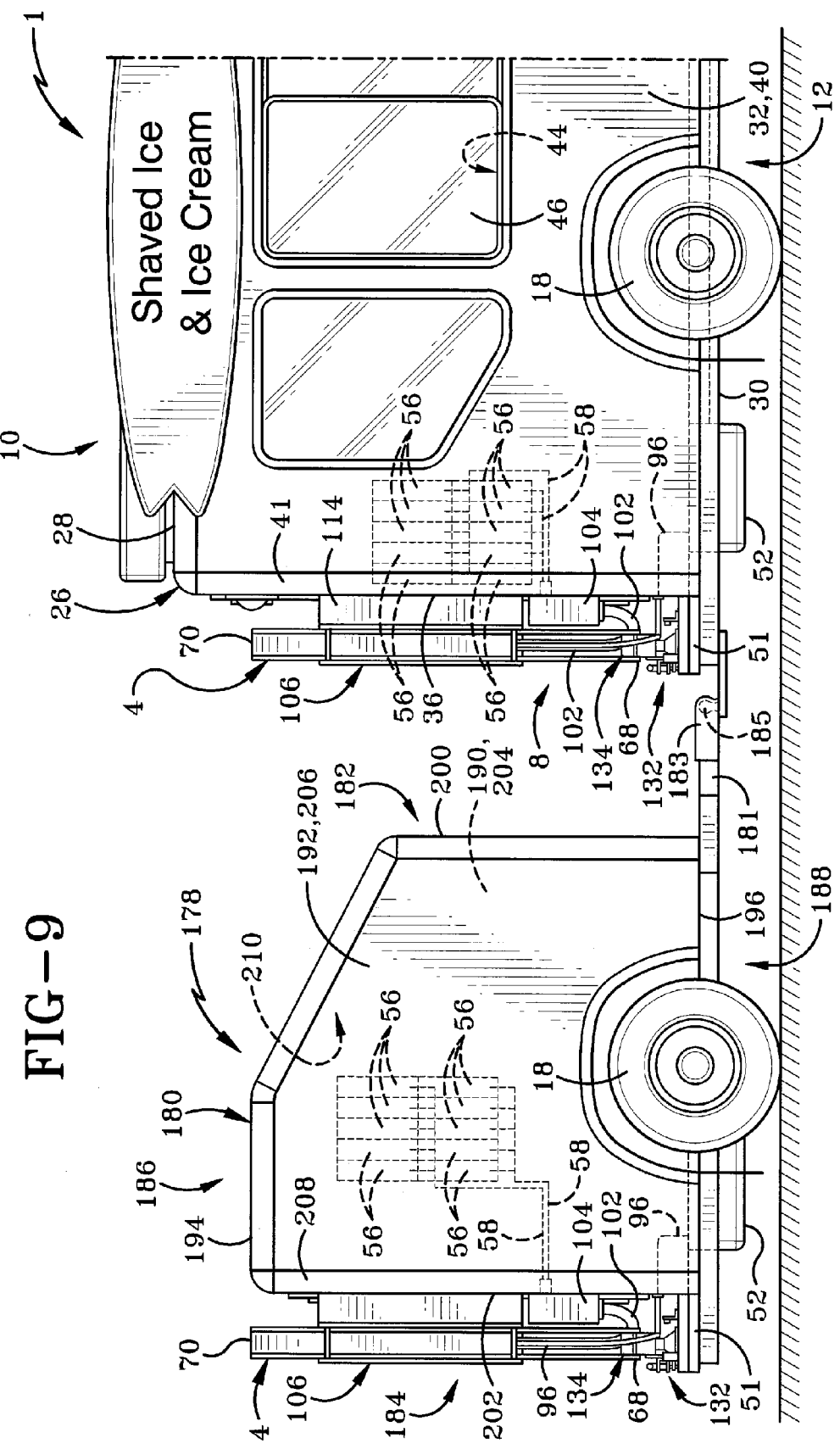

FROZEN CONFECTION KIOSK AND LIQUID-DISPENSING ASSEMBLY FOR USE THEREWITH

BACKGROUND OF THE INVENTION

1. Technical Field

The present invention relates generally to a kiosk for dispensing food and drink items, especially frozen confections such as ice cream, snow cones, shaved ice and the like. More particularly, the invention relates to such a kiosk and a liquid topping dispenser assembly which may be accessed by customers outside the kiosk. Specifically, the invention relates to such a dispenser assembly mounted externally of the kiosk and typically movable between various positions.

2. Background Information

Stationary and mobile kiosks are well known for selling various frozen confections, such as ice cream, shaved ice, snow cones, beverages and so forth. If the kiosk is set up for selling ice cream, there are typically either containers of ice cream which can be scooped into a cone or dish, or soft ice cream makers within the kiosk whereby a person within the kiosk may prepare the ice cream confection for dispensing through a service window upon payment for the item. A kiosk may also be set up to create snow cones, or shaved ice, also typically known as Italian ice. In most cases, a liquid topping dispenser is inside the kiosk for dispensing a sweet liquid topping onto the crushed ice or shaved ice in order to produce the confection which is dispensed through the service window. However, it is also known to provide a liquid topping dispenser assembly which is accessible from outside the kiosk so that the customer can apply the liquid topping to the ice cream, crushed ice, shaved ice, etc. For example, U.S. Pat. No. 8,157,136 granted to Lamb et al. for a mobile confectionery apparatus with a protectable dispensing system discloses a mobile truck or vehicle and several embodiments of liquid topping dispensers which may either be covered in order to protect them when not in use or moved between a dispensing position and a closed position for the same purpose. While the configuration of this patent appears to work well for its intended purpose, there is still room for improvement in the art, which the present invention provides as discussed in greater detail below.

BRIEF SUMMARY OF THE INVENTION

The present invention provides an apparatus comprising: a kiosk comprising a sidewall defining an interior chamber having a size suitable for accommodating a person therein; a frozen confection forming device in the interior chamber; a serving window formed through the sidewall and configured to allow a frozen confection to pass through the window from the interior chamber to outside the kiosk; a first liquid-topping dispenser assembly comprising a first support and a plurality of first liquid-dispensing faucets carried by the support; wherein the dispenser assembly is mounted adjacent and pivotable relative to the kiosk about a vertical axis and the faucets are positioned to be operable by a person outside the kiosk.

The present invention also provides an apparatus comprising: a kiosk comprising a sidewall defining an interior chamber having a size suitable for accommodating a person therein; a frozen confection forming device in the interior chamber; a serving window formed through the sidewall and configured to allow a frozen confection to pass through the window from the interior chamber to outside the kiosk; a liquid-topping dispenser assembly comprising a support and a plurality of liquid-dispensing faucets carried by the support; wherein the dispenser assembly is mounted adjacent and pivotable relative to the kiosk about a first axis and a second axis which extends at an angle to the first axis, and the faucets are positioned to be operable by a person outside the kiosk.

The present invention further provides an apparatus comprising: a kiosk having front and back ends defining therebetween a longitudinal direction, and left and right sides defining therebetween an axial direction; the kiosk comprising a sidewall defining an interior chamber having a size suitable for accommodating a person therein; the sidewall comprising a left wall, a right wall and a back wall; a frozen confection forming device in the interior chamber; a serving window formed through the sidewall and configured to allow a frozen confection to pass through the window from the interior chamber to outside the kiosk; a liquid-topping dispenser assembly which is mounted on the kiosk and comprises a support and a plurality of liquid-dispensing faucets carried by the support; wherein the support extends (a) outwardly to the left beyond the left wall so that the faucets are to the left of the left wall and axially spaced from one another, or (b) outwardly to the right beyond the right wall so that the faucets are to the right of the right wall and axially spaced from one another, or (c) rearwardly beyond the back wall so that the faucets are rearward of the back wall and longitudinally spaced from one another.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 2 shows the dispenser assembly in its lowered dispensing position in solid lines and its raised stored position in dot dash lines.

FIG. 5 shows the dispenser assembly in one dispensing position in solid lines along with two other alternate dispensing positions in dot dash lines.

FIG. 6 is a view similar to FIG. 5 and shows the kiosk with a liquid topping dispensing system which includes two liquid dispenser assemblies.

FIG. 9 is a side elevational view showing a rear portion of the mobile kiosk and a trailer hitched thereto and having mounted thereon the dispenser assembly of the present invention.

Similar numbers refer to similar parts throughout the drawings.

DETAILED DESCRIPTION OF THE INVENTION

Figure 1:
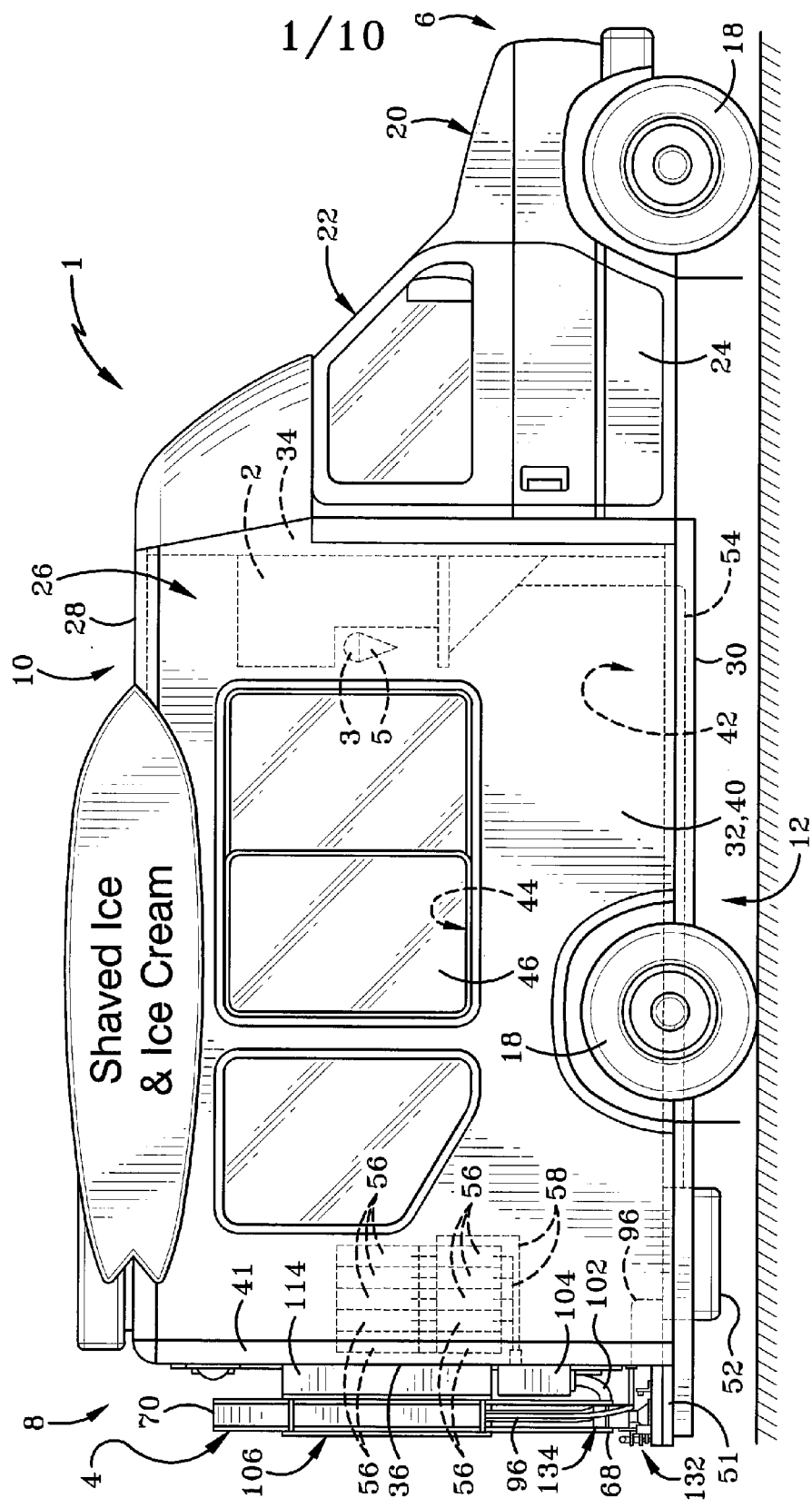
FIG. 1 is a right side elevational view of a kiosk of the present invention shown as a mobile vehicle with the liquid topping dispenser assembly mounted adjacent the rear of the vehicle in the stored position.

The kiosk of the present invention is illustrated generally at 1 in FIG. 1. Although kiosk 1 is illustrated in the Figures as a motorized mobile vehicle, it will be understood by one skilled in the art that kiosk 1 may also represent a non-motorized wheeled vehicle, such as a trailer, a non-wheeled kiosk, which may be seated directly on the ground and either be a permanent structure or one which is portable by, for instance, being picked up by a separate mobile vehicle.

Kiosk or vehicle 1 is configured to produce frozen confections 3 as discussed in the Background section of the present application typically to be contained in a container 5, such as a cup, cone, dish or the like. Kiosk 1 is typically configured with a frozen confection forming device 2 inside the kiosk and a liquid-topping dispenser assembly 4 which is configured to be operated by people outside the kiosk. Thus, vehicle 1 is configured for an operator or other person within the kiosk to produce a frozen confection such as ice cream, a snow cone, shaved ice and the like and dispense it to a customer outside the vehicle so that the customer may dispense the liquid topping with dispenser 4 onto the crushed ice, shaved ice, or frozen confection of any sort.

Vehicle 1 has a front 6 and a back 8 defining therebetween a longitudinal direction of the vehicle or kiosk, a top 10, a bottom 12, and left and right sides 14 and 16 defining therebetween an axial direction of the vehicle or kiosk. Where kiosk 1 is in vehicular form, the longitudinal direction also represents the travel direction of the vehicle. Vehicle 1 includes ground engaging wheels 18 which are rotatably mounted on the frame of the vehicle and include a front set 18 adjacent front 6 and a rear set generally adjacent back 8. Vehicle 1 further includes an engine compartment 20 housing an engine (not shown) which drives rotation of at least some of the wheels in order to cause the vehicle to travel. Vehicle 1 further includes a cab 22 with doors 24 on the driver side and passenger side, and a cargo body or box 26 extending from adjacent the back of cab 22 to adjacent back 8 of the vehicle.

Body 26 includes substantially horizontal and rectangular top and bottom walls 28 and 30 and a side wall 32 secured to and extending between the top and bottom walls 28 and 30. Side wall 32 is an upwardly extending and typically substantially vertical wall and includes substantially vertical front and back walls 34 and 36 which are typically substantially parallel to one another, which are rectangular or square as viewed from the back or front, and which extend axially along respective vertical axial planes. Side wall 32 further includes substantially vertical left and right walls 38 and 40 which are typically substantially parallel to one another and perpendicular to front and back walls 34 and 36. Left and right walls 38 and 40 extend longitudinally and lie along respective longitudinal vertical planes. Walls 34, 36, 38 and 40 are joined to form respective substantially vertical corners. More particularly, the rear end of left wall 38 and a left side of back wall 36 intersect at a substantially vertical left rear corner 39. Similarly, the rear end of right wall 40 and the right side of back wall 36 intersect at a substantially vertical corner 41. Each of corners 39 and 41 extend from adjacent top wall 28 to adjacent bottom wall 30. Top wall 28, bottom wall 30 and side wall 32 define therewithin an interior chamber 42. The cargo body 26 has a generally box shape or parallelepiped configuration.

Figure 7:
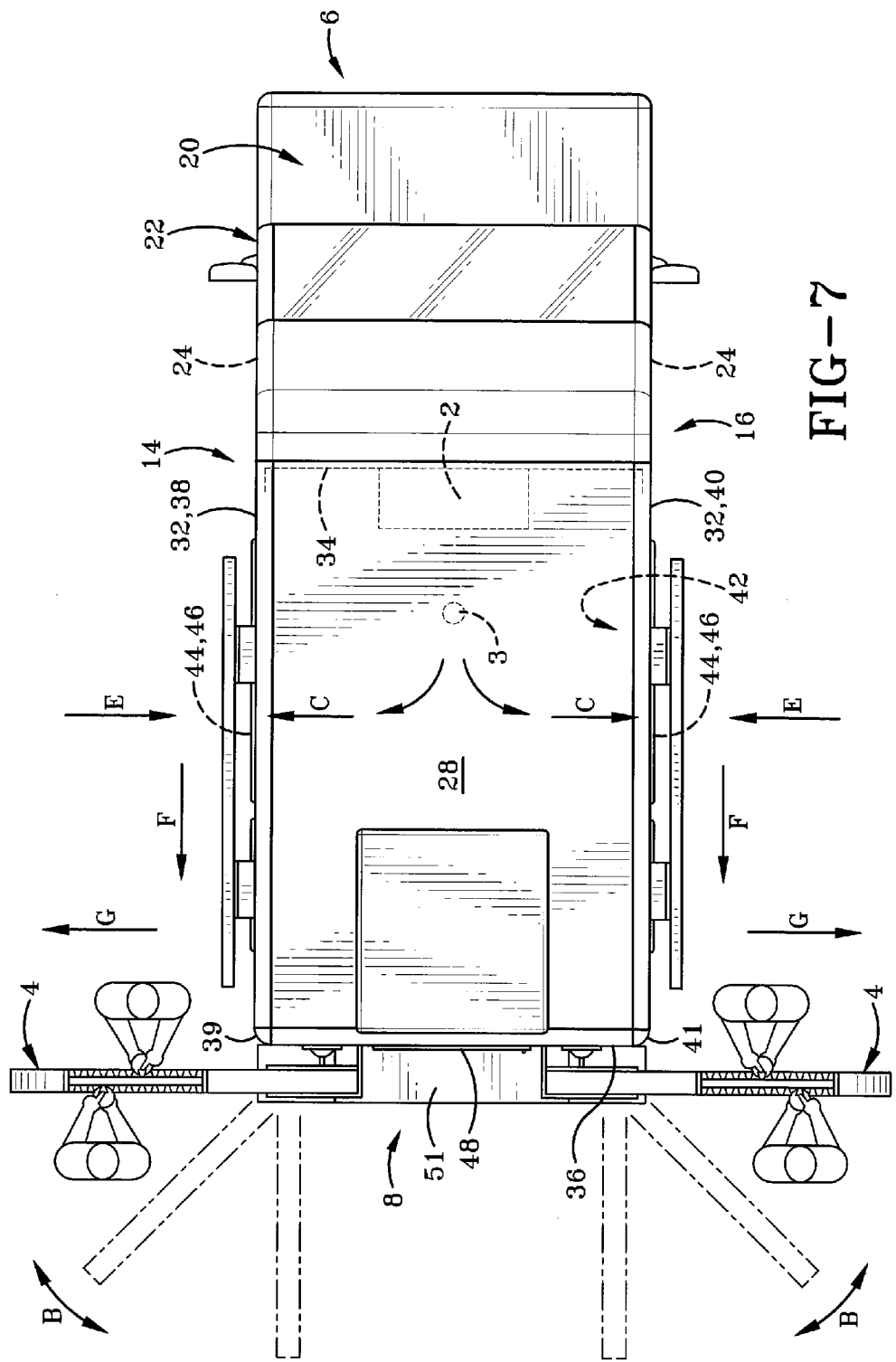
FIG. 7 is a top plan view showing the vehicle with two liquid topping dispenser assemblies mounted respectively near the rear left and right corners of the vehicle and illustrating various aspects of the use of the vehicle.

An opening or service window 44 is formed through right wall 40 with a panel, door or window pane 46 mounted to move between an open and closed position for respectively opening and closing serving window 44. An additional service window 44 and corresponding panel, door or window pane may be positioned along the left side of the vehicle alternatively or in addition to the one along the right side, as illustrated in FIG. 7. Vehicle 1 is provided with a back door 48 which is movable between an open and closed position and which in the exemplary embodiment is mounted on hinges 50 in order to pivot about a vertical axis between the open and closed positions, whereby a person may enter and exit the interior chamber 42 when back door 48 is open. Vehicle 1 further includes a rigid back bumper or step 51 which is typically a substantially horizontal member which extends from adjacent the bottom of left rear corner 39 to adjacent the bottom of right rear corner 41 and extends rearwardly from adjacent the bottom of back wall 36. Step 51, which is rigidly secured to the vehicle frame, is thus configured for a person to step up onto when entering the inside of the kiosk through back door 48.

A waste liquid reservoir or container 52 is mounted on vehicle 1 typically adjacent the back end thereof and often along the bottom of the frame, although the specific position may vary, and container 52 may be within or separate from the vehicle, for instance sitting on the ground. A drain line 54 is connected at one end to forming device 2 with another end thereof connected to container 52 or a separate waste liquid container. A plurality of liquid topping containers 56 are disposed within interior chamber 42 and contain various types of potable liquid toppings (typically having different flavors) which can be dispensed through dispenser assembly 4. Ten of the containers 56 are shown in FIG. 1, although this number may vary substantially. Feed lines 58 are provided typically in the form of flexible hoses or tubes for providing fluid communication between the respective containers 56 and dispenser assembly 4. Thus, one end of each feed line 58 is connected to an outlet of container 56.

Figure 2:
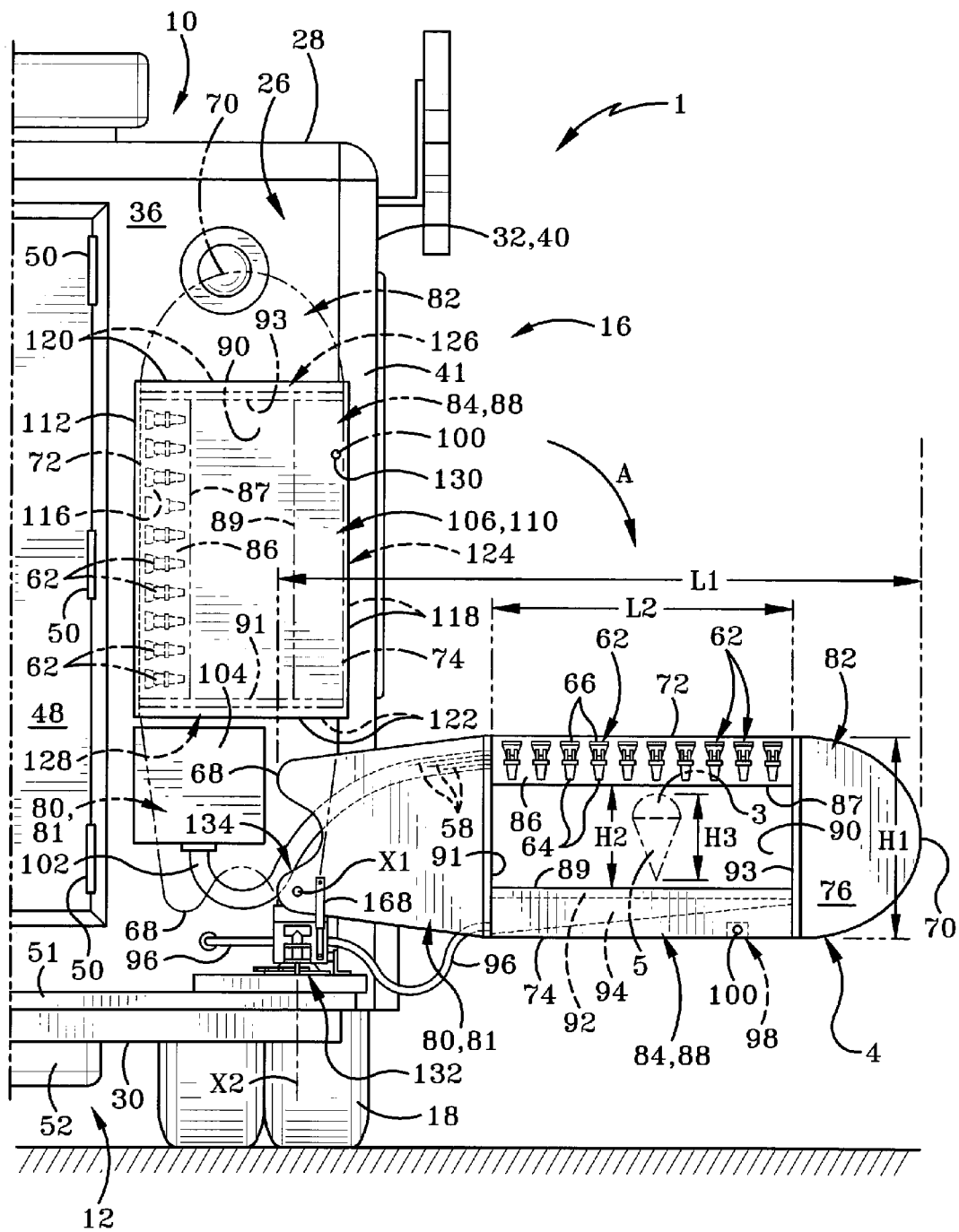
FIG. 2 is a rear elevational view of the dispenser assembly and a portion of the vehicle.

In accordance with the invention and with primary reference to FIG. 2, dispenser assembly 4 includes a rigid dispenser support 60 and a plurality of faucets 62 carried thereby wherein each faucet 62 includes a spout 64 and a control 66 which is manually operable and typically in the form of a button or handle which is movable from a closed position to an open position by manual engagement by a person outside the kiosk. Dispenser assembly is mounted adjacent and external to box 26 and kiosk 1. Dispenser assembly 4 is movable between the lowered dispensing position shown in solid lines in FIG. 2 and the raised stored position shown in dot dash lines in FIG. 2 and is more particularly pivotable between these positions about a horizontal longitudinally extending axis X1. Support 60 has a first or inner end 68 adjacent side wall 32 in the dispensing orientation and a second or outer end 70 distal side wall 32 in the dispensing orientation, wherein ends 68 and 70 define therebetween a horizontal length L1. Although length L1 may vary, in the exemplary embodiment, length L1 is typically in a range of about 3 to 6 feet, and usually in a range of about 4 to 6 feet, and may be on the order of about 5 feet. In the exemplary embodiment, inner end 68 is adjacent the lower end of corner 41, the bottom right side of back wall 36 and the bottom back end of right wall 40 with outer end 70 distal thereto in the dispensing orientation. Support 60 has a top 72 and a bottom 74 defining therebetween a vertical distance or height H1 which is typically no more than ½ length L1 and usually no more than ⅓ length L1. In the exemplary embodiment, height H1 is approximately ⅓ of length L1 although slightly less. Support 60 has first and second sides 76 and 78 defining therebetween a thickness T (FIG. 5) which is typically no more than one-half height H1, and usually no more than one-third of height H1. In the exemplary embodiment, thickness T is about one-fourth height H1. Each of sides 76 and 78 is typically a substantially flat vertical surface.

Support 60 includes an inner segment 80, an outer segment 82 and a central or intermediate segment 84 connected to and extending between inner and outer segments 80 and 82. Inner segment 80 includes first and second walls 81 and 83 which are flat, vertical, parallel and spaced from one another to define therebetween a substantially vertical open space 85. Intermediate segment 84 includes a substantially horizontal upper arm 86 and a substantially horizontal lower arm 88 each of which extends between and is secured to inner and outer segments 82. A first set of faucets 62 is mounted on upper arm 86 and extends outwardly therefrom in a first direction within a recess generally along first side 76 so that no portion of the faucets 62 of the first set extends outwardly beyond first side 76. Similarly, a second set of faucets 62 is mounted on upper arm 86 and extends outwardly therefrom in a second opposite direction within a recess generally along second side 78 so that no portion of the faucets 62 of the second set extends outwardly beyond second side 78. Support 60 defines a rectangular through opening 90 extending from first side 76 to second side 78. More particularly, opening 90 is defined by a horizontal downwardly facing bottom surface 87 of upper arm 86, a horizontal upwardly facing top surface 89 of lower arm 88, a substantially vertical outwardly facing surface 91 of inner segment 80, and a substantially vertical inwardly facing surface 93 of outer segment 82. Substantially parallel surfaces 91 and 93 face one another and define therebetween a horizontal length L2 which is typically at least ¼ length L1 and more typically at least ⅓ length L1. In the exemplary embodiment, length L2 is about and slightly less than ½ length L1. The respective inner and outer ends of upper and lower arms 86 and 88 are secured respectively to surfaces 91 and 93, whereby the inner and outer ends of each arm defines length L2 of each arm 86 and 88, whereby said length is the same as the length of opening 90. Bottom and top surfaces 87 and 89 define therebetween a vertical distance or height H2 which in the exemplary embodiment is about 12 inches although this may vary somewhat and is more particularly configured to allow the frozen confection and its container to pass through opening 90 from one side to the other side of support 60. Thus, the confection 3 and its cone, cup or dish 5 together have as measured from top to bottom a height H3 which is less than height H2.

A flow through structure such as a grate 92 or a plate with multiple apertures extending from the top to the bottom is disposed within a cavity defined by lower arm 88 along the top of arm 88. An angled or inclined drip pan or flow pan 94 is also disposed within this cavity of arm 88 and angles downwardly and inwardly toward inner end 68 and vehicle 1 in general. Thus, any drips or overflow liquid coming from faucets 62 which is not dispensed on the frozen confection or a container or the like drips down onto and through the flow through structure 92 and onto drip pan 94, along which the liquid flows downwardly toward the inner end and into a drain hose 96 having one end connected to the drip pan adjacent its lower end and another end in fluid communication with container 52 for emptying the waste liquid into container 52. A latch mechanism or securing mechanism 98 is mounted on support 60 adjacent the bottom of lower arm 88 and includes a locking member or latch member 100. A hose bundle 102 made up of hoses 58 extends within space 85 and also external to space 85 from adjacent inner end 68 to a hose cover or hose junction box 104 which is rigidly secured to back wall 36. Thus, one end of each hose 58 is connected to a corresponding faucet 62 whereby hoses 58 provide respective fluid communication between the respective containers 56 (FIG. 1) and faucets 62. Hose cover 104 typically has a removable panel or openable door which allows access to hoses 58 within the interior chamber defined by cover 104. In the exemplary embodiment, each hose 58 includes two segments which are connected to one another by a quick disconnect connection which is disposed within box 104. Hoses 58 extend through a hole (covered by box 104) in back wall 36 from outside the vehicle to interior chamber 42.

Figure 3:
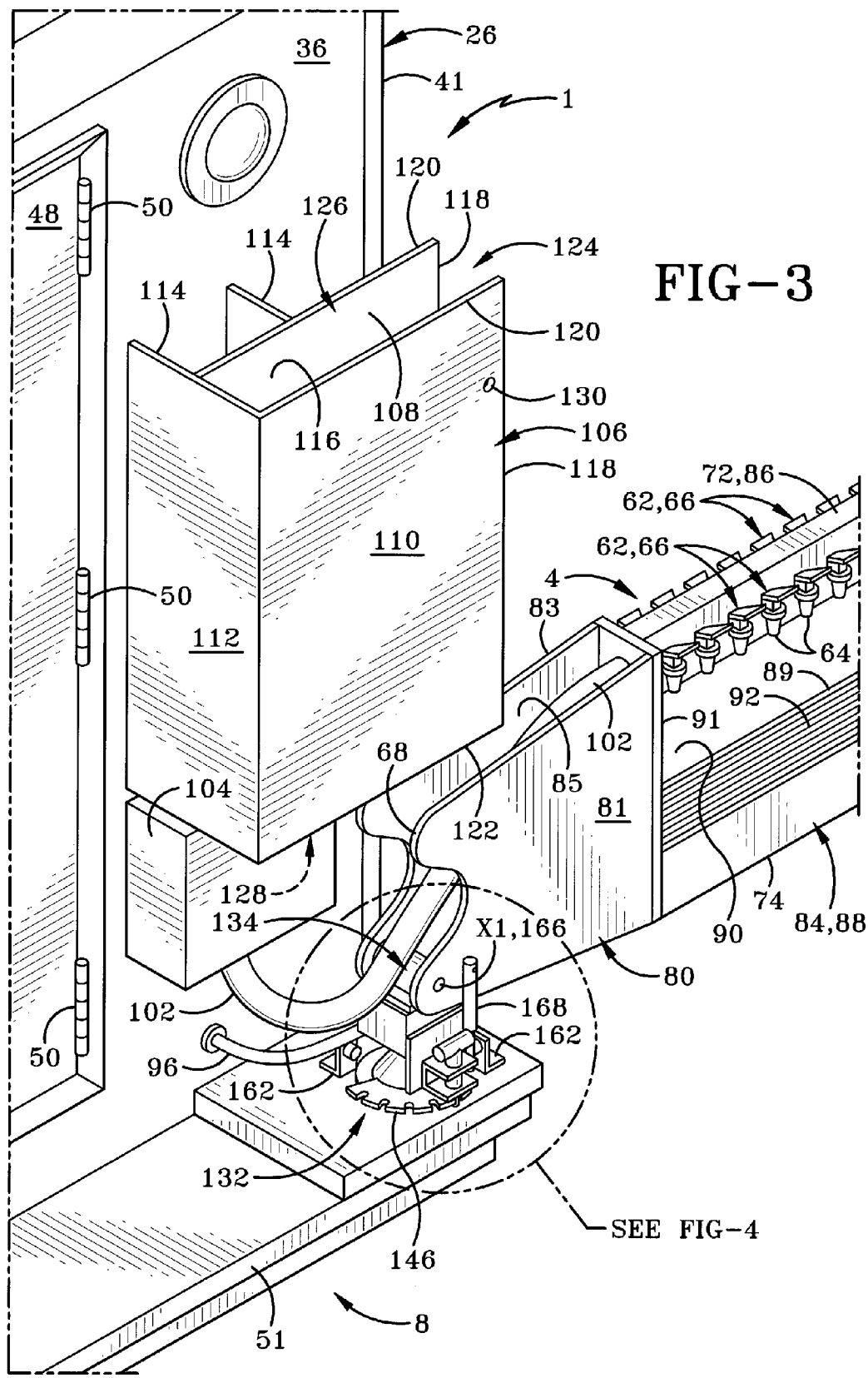
FIG. 3 is a perspective view showing the dispenser assembly, the dispenser assembly cover and other associated structure.

With primary reference to FIGS. 2 and 3, a rigid dispenser storage or protective cover 106 is rigidly mounted on back wall 36 of the kiosk and is configured to receive and cover at least a portion of dispenser assembly 4 in the raised stored position. Cover 106 includes a flat vertical front wall or panel 108 which extends axially along a vertical axial plane, and a parallel flat vertical back wall or panel 110 which likewise extends axially along another vertical axial plane. Cover 106 includes a left side wall or panel 112 which is also substantially flat and vertical and perpendicular to walls 108 and 110 and thus extends longitudinally along a vertical longitudinal plane and is rigidly connected to the left or inner ends of walls 108 and 110. A mounting structure 114 is provided to rigidly secure cover 106 to back wall 36, and in the exemplary embodiment includes a portion of side wall 112 and another vertical wall parallel to wall 112. However, any mounting structure may be utilized. In addition, support 60 may be positioned closer to back wall 36 whereby back wall 36 may serve as the front wall of the cover and thereby replace front wall 108.

Walls 108, 110 and 112 define therewithin a substantially flat vertical cavity 116 which extends axially. Walls 108 and 110 have respective vertical terminal right side edges 118, horizontal top edges 120 and horizontal bottom edges 122. Edges 118 define therebetween a vertical right side entrance opening 124 of cavity 116. Top edges 120 define therebetween a horizontal top entrance opening 126 of cavity 116, and bottom edges 122 define therebetween a horizontal bottom entrance opening 128 of cavity 116. Top entrance opening 126 along its right side communicates with or intersects the top of side entrance opening 124. Likewise, bottom entrance opening 128 along its right side communicates with or intersects the bottom of side entrance opening 124. Thus, cavity 116 is closed on the left side, while remaining opened on the right side, top and bottom. This configuration allows dispenser assembly 4 to move into and out of cavity 116 through each of entrance openings 124, 126 and 128 during pivotal movement about axis X1 between the dispensing and stored orientations. Walls 108, 110 and 112 may also be lengthened vertically upwardly such that cover may also include a top wall closing the top of the cover and thereby accommodating a greater portion of dispenser assembly 4, such as outer segment 82, in the stored position.

Cover 106 includes a latch hole or latch member 130 which receives or engages latch member 100 in the stored position in order to secure dispenser assembly 4 in the stored position and thus prevent assembly 4 from moving out of the stored position. Securing mechanism 98 is typically manually operable to release the engagement between members 100 and 130 to allow assembly 4 to move from the stored position to the dispensing position. Securing mechanism 98 may be a locking mechanism which requires a key to lock and unlock such that it must be unlocked to allow the mechanism to be released and thus dispenser assembly 4 to be lowered to the dispensing orientation. A similar securing mechanism may be provided to secure assembly 4 in the dispensing orientation.

In the exemplary embodiment, the stored orientation of assembly 4 is rotated about 90 degrees about axis X1 relative to the dispensing orientation. Thus, the orientation of various components and surfaces is different in the stored orientation and the dispensing orientation. For example, outer end 70 in the dispensing orientation becomes the top of support 60 and assembly 4 in the stored orientation, while inner end 68 becomes the bottom in the stored orientation. While arms 86 and 88 are substantially horizontal in the dispensing orientation, they are substantially vertical in the stored orientation. Likewise, the horizontal upper and lower surfaces 72 and 87 of upper arm 86 and the horizontal upper and lower surfaces 89 and 74 of lower arm 88 in the dispensing orientation become vertical surfaces in the stored orientation. Opening 90 is horizontally elongated in the dispensing orientation and vertically elongated in the stored orientation. In the stored orientation, the dispenser assembly is entirely or almost entirely directly above step 51 in the exemplary embodiment. In the stored orientation, assembly 4 is also entirely behind body or box 26, whereby no portion of assembly 4 extends outwardly to the right beyond right wall 40 nor outwardly to the left beyond left wall 38 (it is noted that assembly 4 may be mounted adjacent the rear left corner instead of the rear right corner as shown in FIG. 7).

In the dispensing orientation, dispenser assembly 4 is entirely external to cavity 116 of cover 106. In the stored orientation, intermediate segment 84 of assembly 4 is preferably entirely within cavity 116, while inner and outer segments 80 and 82 are typically external to cavity 116. Typically, all or a portion of inner segment 80 is external to and directly below cavity 116 in the stored orientation. Likewise, all or part of outer segment 82 is external to and directly above cavity 116 in the stored orientation; however, if cover 106 extends upwardly a sufficiently further distance than shown, outer segment 82 may be entirely within cavity 116. In the stored orientation, surface 72 is closely adjacent and parallel to side wall 112, the front surface of arm 88 is parallel to and closely adjacent front wall 108, the front set of faucets 62 is adjacent side wall 112 and front wall 108, the rear set of faucets 62 is adjacent side wall 112 and back wall 110, the back surface of arm 88 is parallel to and closely adjacent back wall 110, and surface 74 is perpendicular to walls 108 and 110 and extends from adjacent the front edge 118 of wall 108 to adjacent the front edge 118 of back wall 110.

In the stored orientation, all or nearly all of arm 86 is within cavity 116 with the upper end of arm 86 adjacent top edges 120 and the top edge of side wall 112, and the lower end of arm 86 adjacent bottom edges 122 and the bottom edge of side wall 112. Preferably, all of faucets 62 are entirely within cavity 116 in the stored orientation, and all or nearly all of opening 90 is within cavity 116 in the stored orientation. Usually, all or nearly all of arm 88 is within cavity 116 in the stored orientation with its upper end adjacent the upper edges 120 and the top of entrance opening 124, and its lower end adjacent lower edges 122 and the bottom of entrance opening 124. However, a portion of arm 88 may extend laterally outwardly beyond side edges 118 external to cavity 116 in the stored orientation. Nonetheless, typically a majority of arm 88 is within cavity 116 in the stored orientation. In the stored orientation, faucets 62 are vertically spaced from one another whereas they are horizontally spaced from one another in the dispensing orientation. Other such differences concerning dispenser assembly 4 in the dispensing and stored orientations will be evident from the Figures.

As previously discussed, dispenser assembly 4 is mounted to pivot about a horizontal axis X1. Assembly 4 is also mounted to pivot about another axis which extends at an angle to axis X1 and in the exemplary embodiment is a vertical axis X2 which is thus perpendicular to axis X1. To effect this vertical and horizontal pivoting of assembly 4, a vertical pivot assembly 132 and a horizontal pivot assembly 134 (FIG. 4) are provided, and in the exemplary embodiment are securely mounted on the back step 51. Dispenser assembly 4 is mounted step 51 via pivot assemblies 132 and 134. Vertical pivot assembly 132 includes a rigid mount or hub 136 which is rigidly secured to step 51 and extends upwardly therefrom. Hub 136 includes a frustoconical member 138 and an annular circular flange 140 secured to the bottom of member 138 and extending radially outwardly therefrom in contact with the top of step 51. Assembly 132 further includes a rigid rotatable member 142 which is rotatably mounted on hub 136, typically via a bearing within hub 136, to rotate about vertical axis X2.

A releasable securing mechanism 144 (FIG. 4) is provided to releasably and selectively secure rotatable member 142 and assembly 4 at selected dispensing positions as described further below. Mechanism 144 includes a stationary first securing or engaging member 146 which is rigidly secured to the top of annular flange 140 whereby engaging member 146 and mount 136 are fixed with respect to step 51, the frame of vehicle 1 and the body or box 26 of vehicle 1. Mechanism 144 further includes a movable second securing or engaging member 148 configured to selectively engage engaging member 146 for selectively securing the rotatable member and dispenser assembly in the various positions. In the exemplary embodiment, member 146 is in the form of an arcuate plate having formed therein a plurality of spaced notches or openings 150 which lie along a common arc which is concentric about axis X2. In the exemplary embodiment, plate 46 has an arcuate outer edge which is concentric about axis X whereby notches 150 extend radially inwardly from this outer edge. However, openings 150 could be, for example, formed as holes drilled into the arcuate plate from above. Second engaging member 148 includes a short horizontal handle 152, a locking pin or engaging pin 154 which is removably insertable into opening 150, and a vertical shaft 156 which has a larger diameter than pin 154 and is rigidly secured to the top of pin 154 and to the bottom of handle 152. The user may thus manually engage handle 152 to lift second engaging member 148 upwardly to remove pin 154 from a given opening 150, thereby allowing the lateral rotation of rotatable member 142 and assembly 4 about vertical axis X2. Second engaging member 148 may then be lowered into any chosen one of openings 150 in order to secure the rotatable member and dispenser assembly against rotation at the selected position or angle. Engaging member 148 may be spring biased to the lowered securing position. Rotatable member 142 in the exemplary embodiment includes a pair of horizontal plates having formed therethrough vertically aligned through openings 158 of a diameter slightly larger than that of shaft 156 whereby shaft 156 is vertically slidable within holes 158.

Stops or bumpers 160 (FIG. 4) are provided to limit the rotational movement of rotatable member 142 and dispenser assembly 4 about vertical axis X2. Each of bumpers 160 is mounted on a rigid bumper mount 162 which is rigidly secured to the top of step 51. Bumpers 160 may be formed of various materials and in the exemplary embodiment typically are formed of a compressible but durable rubber, elastomer or plastic material. In the exemplary embodiment, a first one of bumpers 160 and its corresponding bumper mount limits the rotational movement of rotatable member 142 and dispenser assembly 4 about vertical axis X2 in a first direction (Arrow B1) via the engagement between rotatable member 142 and the first bumper or stop 160, while a second one of bumpers 160 and its bumper mount 162 limits the rotational movement of rotatable member 142 and dispenser assembly 4 about axis X2 in a second opposite direction (Arrow B2) by engagement between rotatable member 142 and the second stop or bumper 160. Although the rotation of rotatable member 142 and dispenser assembly 4 about vertical axis X2 may be driven by a drive mechanism such as a motor, it is typically rotated manually when securing mechanism 144 is in the unsecured or disengaged position in which the engaging surface of pin 154 is out of engagement with the engaging surfaces defining openings 150.

Figure 4:
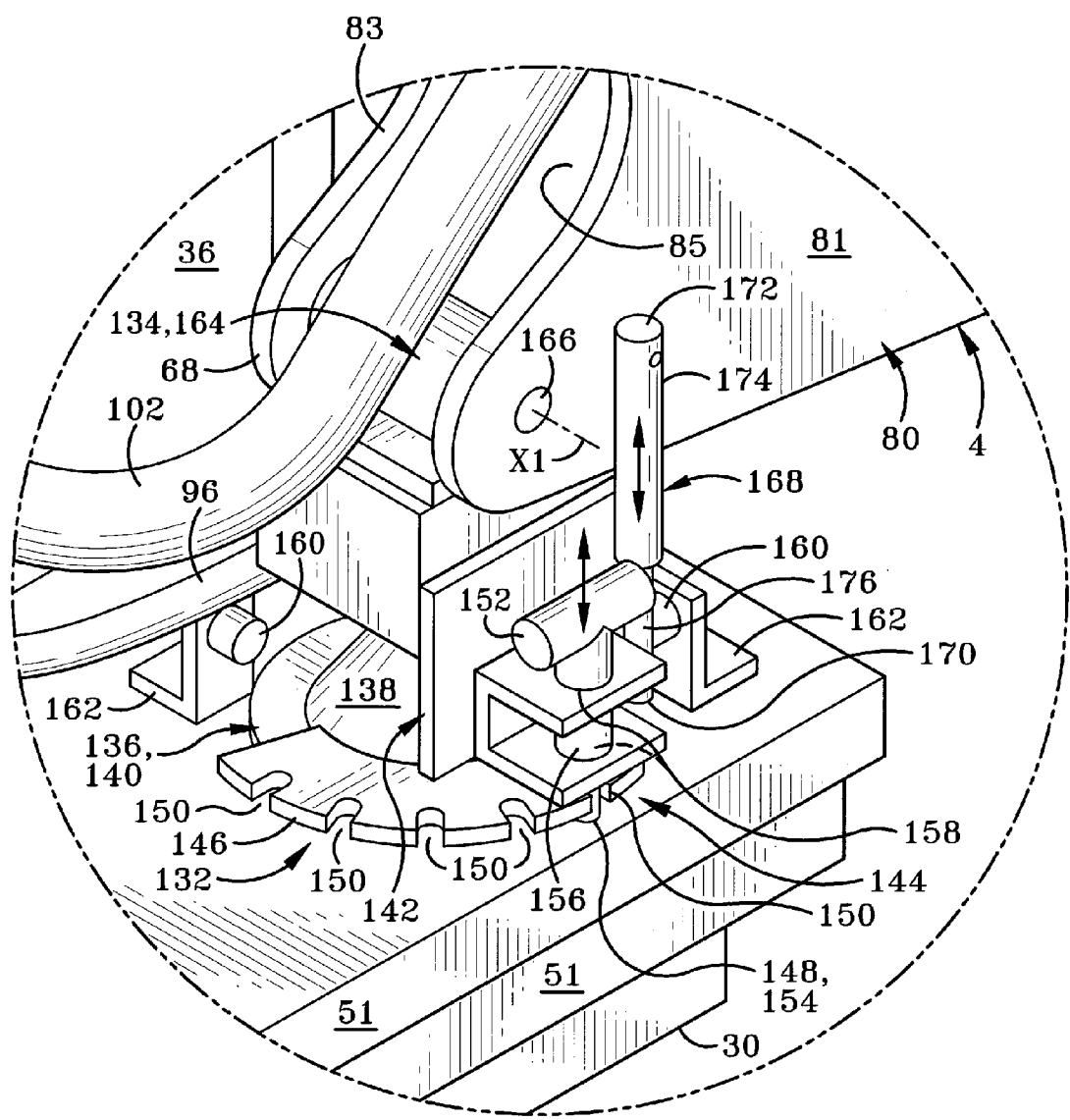
FIG. 4 is an enlarged perspective view of the encircled portion of FIG. 3 showing the pivot assemblies and related structure.

With continued primary reference to FIG. 4, horizontal pivot assembly 134 is mounted on and rotatable with rotatable member 142 so that dispenser assembly 4 is likewise rotatable with rotatable member 142. Pivot assembly 134 may be configured with a sleeve 164 which is within space 85 adjacent inner end 68 and the lower end of inner segment 80. Sleeve 164 extends from adjacent first wall or panel 81 to adjacent second wall or panel 83 and may contain a bearing or bushing around a shaft, pivot or pivot pin 166 through which axis X1 passes. Pivot 166 may be rigidly secured to panels 81 and 83 adjacent its opposed ends and rotatably mounted within sleeve 164 via a bearing or bushing therein to rotatably mount dispenser assembly 4 about axis X1. In this configuration, sleeve 164 is rigidly and fixedly secured to rotatable member 142 to rotate therewith about axis X2. Alternately, for example, pivot 166 may be rigidly secured to component 164, while panels 81 and 83 are pivotally mounted relative to pivot 166 in order to provide the upward and downward pivoting movement of dispenser assembly 4 about axis X1. Alternately, component 164 may be a drive mechanism in the form of a powered motor such as an electric or hydraulic motor in which case component 166 is a drive shaft rotatably mounted on the motor housing for providing rotational output thereof and rigidly secured to walls 81 and 83 to drive the rotational movement of dispenser assembly 4 about axis X1.

An extendable-retractable member 168 (FIG. 4) may also be provided wherein the first or lower end 170 thereof is pivotally mounted about a horizontal axis on rotatable member 142 and a second or upper end 172 of member 168 is pivotally mounted about a parallel horizontal axis on inner segment 80 of support 60 at a location offset from axis X1. The axes about which the opposed ends of member 168 pivot are parallel to and offset from axis X1. More particularly, member 168 includes a cylinder 174 and a piston 176 slidably received therein. Member 168 may be in the form of a gas spring or other resistance mechanism for resisting and thereby controlling the lowering pivotal movement of the dispensing assembly 4 from its raised stored orientation to its lowered dispensing orientation. While member 168 is a gas spring, it also serves as a force producing mechanism which applies an upward force on support 60 to assist especially in the manual raising of assembly 4 from the dispensing to the stored position, although the gas spring typically would not alone apply all the force necessary to effect this raising. Member 168 may also be in the form of a linear actuator such as a pneumatic piston-cylinder combination or a hydraulic piston-cylinder combination, whereby this pneumatic or hydraulic actuator is configured to drive and/or control the movement of the dispenser assembly 4 between the dispensing and stored orientations. More particularly, such an actuator would typically serve as a drive mechanism for driving the pivotal movement from the lowered to the raised orientation and a resistance mechanism for resisting and controlling the lowering movement of the dispenser assembly from the raised to the lowered orientation.

Figure 5:
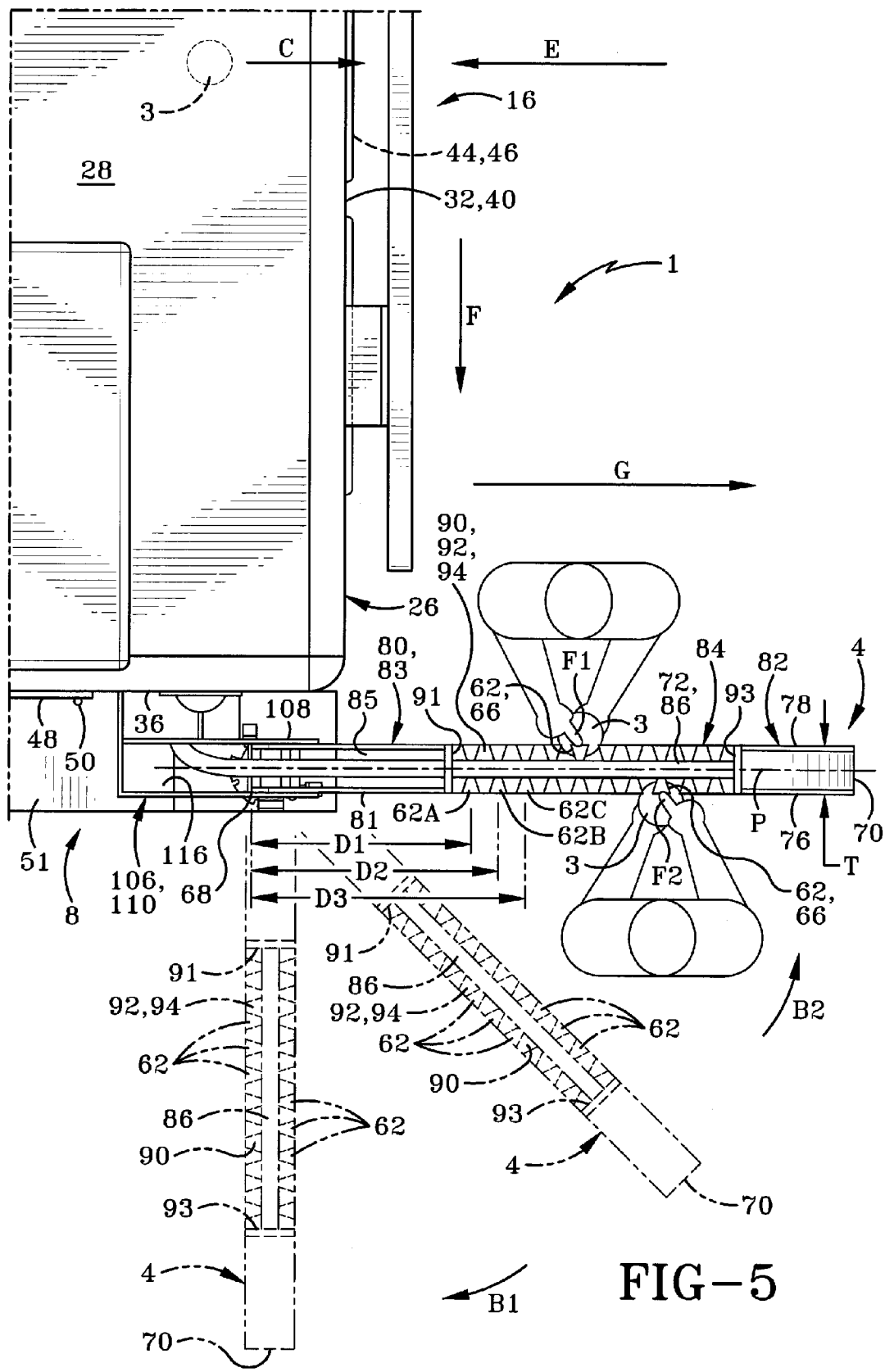
FIG. 5 is a top plan view of the right rear portion of the vehicle along with the dispenser assembly being used by people on opposite sides thereof.

The operation of kiosk 1 and the relationship of various components is now described with primary reference to FIGS. 2 and 5 although much of the movement and operational aspects will be understood from the previous description. When the kiosk is in the form of a mobile kiosk or vehicle 1, the driver of the vehicle will drive to a desired location for setting up to sell and dispense frozen confections and likely other food items as well. Once the vehicle is parked, the driver or another person will lower the dispenser assembly 4 from the raised stored orientation to the lowered dispensing orientation, as indicated at Arrow A in FIG. 2. Where a locking or latching mechanism is used, the user will thus first unlock or release the mechanism such as mechanism 98 to unlock or release dispenser assembly 4 from cover 106, whereby the movement from the stored to dispensing orientations is allowed. Moving dispenser assembly 4 about horizontal axis X1 from the stored to the dispensing orientation without further rotating dispenser assembly 4 about vertical axis X2 by itself places dispenser assembly 4 in a dispensing position whereby it is ready for customers outside the kiosk to use for dispensing liquid toppings onto their frozen confections. However, dispenser assembly 4 may also be rotated about vertical axis X2 between any number of alternate dispensing positions. FIG. 5 illustrates three of these dispensing positions, one in solid lines and two alternate dispensing positions in dot dash lines. The position shown in solid lines in FIG. 5 will be referred to as the forward or front position, the position shown in dot dash lines which extends straight downwardly in FIG. 5 will be referred to as the rear or rearward position, and the dot dash line position which is shown angling downward and to the right in FIG. 5 will be referred to as the center intermediate position.

As previously discussed, the operator will release securing mechanism 144 (FIG. 4) by lifting engaging member 148 via handle 152, thereby removing pin 154 from within a given opening 150 to eliminate the interference between securing members 146 and 148 which prevents pivotal movement of dispenser assembly 4 about axis X2 in the secured position. With mechanism 144 in the released or unsecured position, the user typically simply applies a force by pushing or pulling on dispenser assembly 4 to pivot it about axis X2 from one dispensing position to another. Once dispenser assembly 4 is in a given dispensing position, engaging member 148 is again lowered to the securing position with pin 154 in one of the corresponding openings 150 to secure dispenser assembly 4 in the given dispensing position. When dispenser assembly is in the forward position shown in FIG. 5, pin 154 is in the rearmost opening 150 which is shown in FIG. 4 also as being the opening 150 furthest to the right. When dispenser assembly is in the center intermediate position of FIG. 5, pin 154 will be disposed in the middle opening 150, or the third opening 150 from the right of the five openings 150 shown in FIG. 4. When the dispenser assembly 4 is in the rear position of FIG. 5, pin 154 will be disposed in the fifth opening 150 from the right to secure dispenser assembly 4 in the rearward position. Inasmuch as there are five openings 150, as shown in FIG. 4, it is evident that two additional intermediate dispensing positions are contemplated in the exemplary embodiment wherein one of these positions is between the front position and center intermediate position, and the other of these positions is between the rear position and the center intermediate position. It will be understood that any number of dispensing positions may be provided along with a securing mechanism to secure them in any of these positions.

FIG. 5 illustrates that the various faucets 62 of a given set thereof are spaced along the length of assembly 4 and support 60 at regular intervals so that when the assembly 4 is in the dispensing position, one of the faucets 62 is generally closest to the vehicle or kiosk with the remaining faucets 62 of a given set sequentially further away therefrom. This is in part illustrated by the horizontal distances D1, D2 and D3 shown in FIG. 5. More particularly, inner end 68 and the center of the first or closest faucet 62A define therebetween distance D1; inner end 68 and the center of the second or second closest faucet 62B define therebetween distance D2; and inner end 68 and the center of the third or third closest faucet 62C define therebetween distance D3. As easily understood from FIG. 5, distance D2 is greater than distance D1, and distance D3 is greater than distances D1 and D2. In addition, the difference between distance D3 and D2 is typically the same as the difference between distance D2 and D1, which is consistent with the faucets 62 being equally spaced along the length of support 2.

The present paragraph will describe the orientation of dispenser assembly 4 and its relationship to other components in the front position of FIG. 5. Dispenser assembly 4, support 60 and especially the opposed sides 76 and 78 thereof extend axially perpendicular to left and right walls 38 and 40 of the vehicle and parallel to front and back walls 34 and 36 thereof. Dispenser assembly 4 is entirely rearward of back wall 36, and extends outwardly to the right beyond right wall 40. A portion of inner segment 80 adjacent inner end 68 is directly below cavity 116 of cover 106 while the remainder of assembly 4 extends outwardly to the right beyond cavity 116 and the right side of cover 106. No portion of dispenser assembly 4 extends rearwardly beyond back wall 110 of cover 106 nor beyond the back end of step 51, which represents the rearmost portion of vehicle 1. Well over ½ and typically well over ¾ of the horizontal length L1 of dispenser assembly 4 and support 60 extends outwardly to the right beyond right wall 40. Thus, all of the following are entirely positioned outwardly to the right of right wall 40: outer segment 82, intermediate segment 84 including upper and lower arms 86 and 88, opening 90, surfaces 91 and 93, flow through structure 92, drip pan 94, and all of the faucets 62. In the exemplary embodiment, over ½ of the horizontal length of inner segment 80 is likewise disposed outwardly to the right of right wall 40. The faucets 62 of each of the front and rear sets thereof are axially spaced from one another typically with the same axial distance defined between each adjacent pair of the faucets 62 in a given set. However, the faucets 62 of a given one of the sets is not longitudinally spaced from the others since they are aligned along a common axially extending line.

This paragraph will describe the orientation of dispenser assembly 4 and its relationship to other components in the center intermediate position of FIG. 5. Dispenser assembly 4, support 60 and sides 76 and 78 extend at about a 45 degree angle relative to left wall 38, right wall 40, back wall 36 and the vertical planes along which they lie or which they define. These walls or planes and each of dispenser assembly 4, support 60 and sides 76 and 78 thus define therebetween either an acute angle or an obtuse angle. Dispenser assembly 4 is entirely rearward of back wall 36, and extends outwardly to the right beyond right wall 40 with inner end 68 adjacent corner 41 and side wall 32 generally, and such that outer end 70 is distal corner 41 and side wall 32 generally. A portion of inner segment 80 adjacent inner end 68 is directly below cavity 116 of cover 106 while the remainder of assembly 4 extends outwardly to the right and rearwardly beyond the cavity 116 and the right side of cover 106. Well over ½ and typically well over ¾ horizontal length L1 of dispenser assembly 4 and support 60 extends rearwardly beyond back wall 110 of cover 106 and the back end of step 51. In addition, well over ½ and typically well over ¾ of the horizontal length L1 of dispenser assembly 4 and support 60 extends outward to the right beyond right wall 40 and the right side of cover 106. Thus, all of the following are entirely positioned outwardly to the right of right wall 40: outer segment 82, intermediate segment 84 including upper and lower arms 86 and 88, opening 90, surfaces 91 and 93, flow through structure 92, drip pan 94, and all of the faucets 62. In addition, a portion of inner segment 80 is disposed outwardly to the right of right wall 40. The faucets 62 of each of the front and rear sets thereof are axially spaced from one another with the same axial distance defined between each adjacent pair of the faucets 62 in a given set, and also longitudinally spaced from one another with the same longitudinal distance defined between each adjacent pair of the faucets 62 in a given set.

This paragraph will describe the orientation of dispenser assembly 4 and its relationship to other components in the rear position of FIG. 5. Dispenser assembly 4, support 60 and sides 76 and 78 thereof extend longitudinally parallel to left and right walls 38 and 40 and perpendicular to front and back walls 34 and 36. Dispenser assembly 4 is entirely rearward of back wall 36, and more particularly, is entirely directly behind back wall 36. Thus, no portion of dispenser assembly 4 extends outwardly to the right beyond right wall 40 (nor outwardly to the left beyond left wall 38). A portion of inner segment 80 adjacent inner end 68 is directly below cavity 116 of cover 106 while the remainder of assembly 4 extends rearwardly beyond cavity 116 and beyond back wall 110 of cover 106. Well over ½ and typically well over ¾ of the horizontal length L1 of dispenser assembly 4 and support 60 extends rearwardly beyond back wall 110 and the back end of step 51. No portion of dispenser assembly 4 extends outwardly to the right beyond the right side of cavity 116 and the right side of cover 106, as defined by edges 118. All of the following are positioned entirely rearwardly of back wall 110 and the back of step 51: outer segment 82, intermediate segment 84 including upper and lower arms 86 and 88, opening 90, surfaces 91 and 93, flow through structure 92, drip pan 94, and all of the faucets 62. Over ½ of the horizontal length of inner segment 80 is disposed rearwardly of back wall 110 and the back end of step 51. The faucets of each of the sets thereof, which have been previously referred to as the front and rear sets, may now be referred to as the right and left sets of faucets 62. The faucets 62 of the left and right sets thereof are longitudinally spaced from one another with the same longitudinal distance defined between each adjacent pair of the faucets 62 in a given set. However, the faucets 62 of a given one of the sets is not axially spaced from the others since they are aligned along a common longitudinally extending line.

FIG. 5 illustrates that one set of the faucets 62 are arranged along one side of support 60 and another set of faucets 62 is arranged along the other side of support 62. This configuration is intended to allow one or more customers to use the faucets of one set while standing on one side of support 60 while one or more customers simultaneously uses the faucets 62 of the other set while standing on the opposite side of support 62. In the exemplary embodiment, each of the sets includes ten faucets 62. In the front dispensing position shown in solid lines in FIG. 5, one of the sets may be referred to as the front set and the other as the rear set. As shown in FIG. 5, the front set of faucets and the rear set of faucets are on opposite sides of a vertical axially extending plane P which is positioned between and parallel to sides 76 and 78 of support 60 such that plane P passes through inner and outer ends 68 and 70. The front set and rear set of faucets are likewise on opposite sides of plane P in the stored orientation. It is noted that inasmuch as there are twenty faucets 62 shown in FIG. 5, there would accordingly be twenty hoses 58 connected respectively thereto as well as twenty topping containers 56 connected respectively to the opposite ends of hoses 58.

Depending on the specific location chosen by the vendor for parking vehicle 1 for selling and dispensing frozen confections and the like, he or she may choose to leave the dispenser assembly 4 in the forward dispensing position or rotate the dispensing assembly 4 about vertical axis X2 (Arrow B1) to the rearward dispensing position or any intermediate position between the forward and rearward positions. More particularly, certain conditions may require that the vehicle be positioned in a relatively narrow space such that placing the dispenser assembly 4 in the forward position is not feasible or desirable, such as when a wall or other obstacle extends along the side of the vehicle on which dispenser assembly 4 is mounted whereby the wall or obstacle would physically interfere with positioning assembly 4 in the forward position or be undesirable in that dispenser assembly 4 may undesirably block pedestrian traffic or the like. Thus, placing dispenser assembly 4 in the rearward position or one of the intermediate positions would allow assembly 4 to be used without contacting a wall or other obstacle, and also leave open space along the side of the vehicle to allow for pedestrian traffic in a desirable manner.

In addition, the different dispensing positions of assembly 4 may offer advertising advantages which are suited to a specific location of the vehicle. For instance, the sides 76 and 78 of dispenser assembly 4, which are relatively large surfaces on which advertising or customer-attracting images may be displayed, are more easily visible from the front or from the rear when in the forward dispensing position, whereas sides 76 and 78 are more easily visible from the left side and right side when in the rear dispensing position. The center or other intermediate dispensing positions offer good visibility both from the front and back, as well as the right and left sides. Regardless of which dispensing position is chosen, the substantial length of dispenser assembly 4 provides an additional visual display which may be a customer attracting feature.

Although the vendor will typically park the vehicle at the location chosen for selling and dispensing the frozen confections before moving dispenser assembly 4 from the stored to the dispensing orientation, it may be desirable to lower the dispenser assembly 4 from the stored to the dispensing orientation while the vehicle is parked at one location, then pivot the dispenser assembly 4 about the vertical axis to one of the alternate dispensing positions, and then move the vehicle to a final selling and dispensing location while the dispenser assembly 4 is in the alternate dispensing position in order to, for example, avoid contacting a wall or other obstacle which may otherwise damage dispenser assembly 4. It is also noted that in the exemplary embodiment, dispenser assembly 4 must be moved from the stored to the dispensing orientation and thus out of cover 106 before dispenser assembly 4 can be rotated or pivoted about the vertical axis X2.

Referring to FIG. 5, once the vendor has parked the vehicle and positioned dispenser assembly 4 as desired, the system is ready for producing, dispensing and selling frozen confections. More particularly, the vendor or operator will typically operate device 2 (FIG. 1) to produce frozen confection 3 within a cup, cone, dish or the like after having been ordered by a customer via serving window 44 when panel 46 is opened. The vendor then receives money or another form of payment through the service window and hands or moves confection 3 with its container 5 through the service window (Arrow C) to the customer outside the vehicle. Arrows E, F and G show the general pedestrian or customer traffic flow during the process of selling the frozen confections and applying the liquid topping onto the confection. More particularly, Arrow E illustrates a line of customers and a customer approaching the service window to place the order, Arrow F illustrates the customer walking rearwardly toward dispenser assembly 4, and Arrow G illustrates the customer walking away from the vehicle and dispenser assembly 4 after having used one or more of faucets 62 to apply one or more liquid toppings to the confection.

FIG. 5 also illustrates more than one person applying the liquid topping simultaneously or generally at the same time from opposite sides of dispenser assembly 4. Thus, a customer may walk around the outer end 70 of dispenser assembly 4 to use the rear set of faucets 62. FIG. 5 more particularly illustrates one customer using one of faucets 62 of the front set of faucets by manually moving control 66 of the given faucet 62 with a finger F1 to open faucet 62 such that the liquid topping flows from one of containers 56 through hose 58 and the corresponding spout 64 and downwardly onto confection 3. FIG. 5 likewise illustrates another person on the opposite side of the dispenser assembly utilizing one of the faucets of the rear set by manually moving the control 66 of a given faucet with a finger F2 to the same effect. When dispenser assembly 4 is in the forward dispensing position of FIG. 5, a person using the front set of faucets 62 is typically directly between side 78 of assembly 4 and right wall 40 of side wall 32. When dispenser assembly 4 is in the rear dispensing position of FIG. 5, a person using the left set of faucets 62 may be directly between side 76 of assembly 4 and back wall 36 of side wall 32.

Figure 5A:
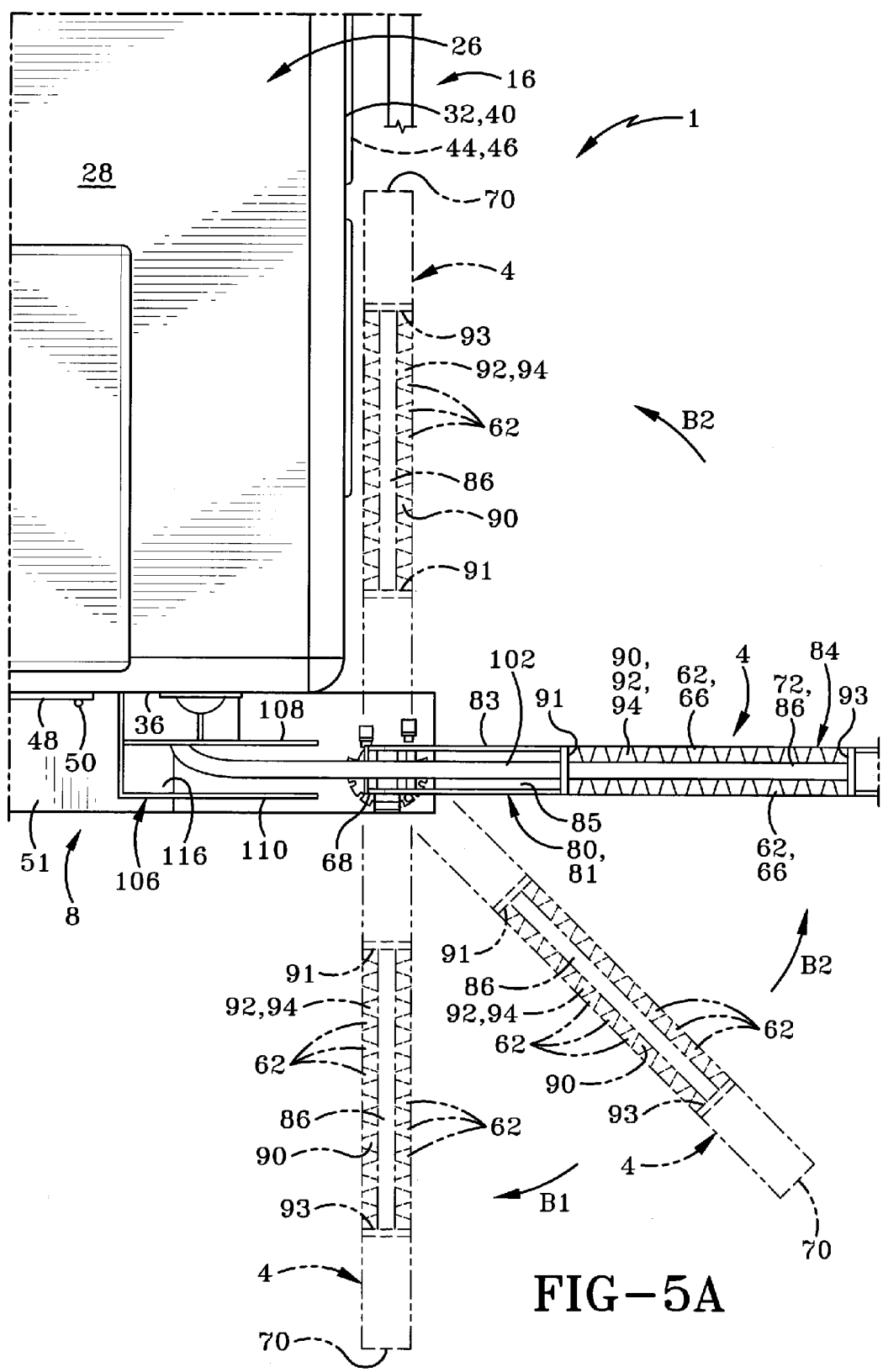
FIG. 5A is similar to FIG. 5 and shows the dispenser assembly in an alternate location to the right of the right wall to allow the dispenser assembly to pivot forward to a dispensing position parallel to and adjacent the right wall.

FIG. 5A shows dispenser assembly 4 in an alternate location in which the dispenser mounting assembly including pivot assemblies 132 and 134 are secured to step 51 to the right of right wall 40 and rearward of back wall 36. Step 51 may simply be a longer version than that shown in the other figures and thus extend outwardly to the right to the extent shown in FIG. 5A to provide this alternate mounting location. In addition, step 51 may, for example, include a stationary portion and a slidable portion on which mounting assembly 132, 134 is mounted and which slides horizontally between a leftward first position (the same as shown in FIG. 5) and a rightward second position shown in FIG. 5A so that the mounting assembly and dispenser assembly 4 are slidable to the left and right with the slidable portion of step 51.

This alternate mounting location allows dispenser assembly 4 to pivot 180 degrees or more about a vertical axis, and thus allow assembly 4 to pivot forward to a forward dispensing position in which assembly 4, support 60 and sides 76 and 78 are parallel to and adjacent right wall 40. The forward position of FIG. 5A is thus different than the forward position of FIG. 5. The stop 62 used to limit the forward pivotal movement of dispenser assembly 4 to the forward position of FIG. 5 has been repositioned to allow the forward pivotal movement of assembly 4 to the forward position of FIG. 5A. In addition, the arcuate plate or engaging member 146 of FIG. 4 has been extended to form a semicircular plate with additional holes or notches which are like notches 150 and likewise lie on a common arc of a circle concentric about the vertical axis about which dispenser assembly 4 rotates to allow the rotatable member and dispenser assembly 4 to be secured in the additional positions provided by the modified configuration in FIG. 5A. Several dispensing positions are shown in FIG. 5A, including the forward position noted above, a rearward position analogous to the rearward position of FIG. 5, and a rightward position analogous to the forward position of FIG. 5.

In all of the dispensing positions shown in FIG. 5A, inner end 68 and the dispenser mounting assembly 132, 134 are adjacent rear right corner 41, and dispenser assembly 4 is entirely to the right of right wall 40 such that no portion of assembly 4 is directly behind back wall 36. Assembly 4 may, however, be configured to pivot so that outer end 70 and other portions of assembly 4 are to the left of right wall 40 and directly behind back wall 36. In the rearward and rightward dispensing positions of FIG. 5A, dispenser assembly 4 is entirely rearward of back wall 36. In the forward position of FIG. 5A, well over ½ length L1 and typically well over ¾ length L1 of dispenser assembly 4 is directly to the right of right wall 40 and forward of back wall 36 and the front of step 51. In the forward position of FIG. 5A, outer end 70, outer segment 82, intermediate segment 84 including upper and lower arms 86 and 88, faucets 62, opening 90, surfaces 91 and 93, and a portion of inner segment 80 are directly to the right of right wall 40 and forward of back wall 36. The faucets 62 in each set are longitudinally spaced and not axially spaced in the forward position of FIG. 5A. The forward position of FIG. 5A provides an additional position which the vendor may use either for dispensing the liquid toppings or as a temporary position so that the vendor may move vehicle 1 without dispenser assembly 4 being in the stored position or in one of the other dispensing positions in which assembly 4 extends outwardly from adjacent sidewall 32 so that outer end 70 is distal sidewall 32.

Referring now to FIG. 6, the vehicle has been modified to include an additional dispenser assembly 4A which is identical to dispenser assembly 4, but is mounted in a slightly different manner. More particularly, dispenser assembly 4A is mounted to pivot about horizontal axis X1 from its stored orientation to its dispensing orientation, but is incapable of rotating about a vertical axis or other axis. Thus, dispenser assembly 4A has only a single dispensing position. In the exemplary embodiment, dispenser assemblies 4 and 4A are thus pivotable between their respective stored and dispensing orientations about a common horizontal axis X1, although dispenser assembly 4A may be configured to pivot about a parallel horizontal axis which is offset from axis X1.

Along with the addition of dispenser assembly 4A, the modified dispensing system of FIG. 6 likewise includes an additional dispenser assembly cover 106A which has substantially the same configuration as cover 106 and is positioned directly behind back wall 36 entirely, and is also positioned directly between back wall 36 and cover 106. Cover 106A thus includes a front wall or panel 108A, a back wall or panel 110A and a left side wall 112A which are substantially identical to and analogous to walls 108, 110 and 112 of cover 106. Cover 106A thus defines a cavity 116A analogous to and identical to cavity 116, and is configured to receive therein dispenser assembly 4A in the stored orientation in the same manner as dispenser assembly 4 is received within cavity 116. Thus, the various relationships between dispenser assembly 4A and cover 106A is the same in the stored orientation and the displayed orientation of dispenser assembly 4A as was described with respect to dispenser assembly 4 in its stored orientation and forward dispensing position with respect to cover 106.

FIG. 6 also illustrates the relationship between dispenser assembly 4A and its dispensing position and dispenser assembly 4 in its various dispensing positions. For example, when dispenser assembly 4A is in its dispensing position and assembly 4 is in its forward dispensing position, the two dispensing assemblies, their respective supports and the sides 76 and 78 thereof are parallel to one another. When dispenser assembly 4 is moved to its rear dispensing position by rotation (Arrow B1) about axis X2, dispenser assemblies 4 and 4A and their corresponding supports 60 and sides 76 and 78 are perpendicular to one another. When dispenser assembly 4A is in its dispensing position and assembly 4 is in the intermediate dispensing position shown in FIG. 6, dispenser assembly 4 and its support 60 and sides 76 and 78 are at an acute angle and in particular a 45 degree angle relative to dispenser assembly 4A, its support 60 and corresponding sides 76 and 78 thereof. Dispenser assembly 4 and assembly 4A are independently movable between their respective stored and dispensing orientations, whereby both assemblies 4 and 4A may be simultaneously in their respective stored orientations, or alternately in their respective dispensing orientations, or with one of them in the stored orientation and the other in the dispensing orientation. Especially when the two dispenser assemblies are in their dispensing orientations with assembly 4 in its rear dispensing position whereby the two assemblies are at right angles to one another, the sides of the two dispenser assemblies provide a greater exposure which is more readily visible to potential customers from the front, the rear, the left and the right of the vehicle. In addition, the number of faucets 62 which are accessible to customers outside the kiosk is doubled, whereby in the exemplary embodiment there are forty faucets 62 along with the corresponding number of hoses 58 and topping containers 56. Thus, one or more people can use dispensers 62 on each side of dispenser assembly 4A as well as on each side of dispenser assembly 4 at the same time when dispenser assembly 4 is in its rear position or one of the intermediate positions, whereby one or more people may stand directly between dispenser assembly 4 and dispenser assembly 4A.

FIG. 7 shows vehicle 1 with two dispenser assemblies 4 mounted thereon. More particularly, one of dispenser assemblies 4 is mounted adjacent the right rear corner 41 as previously discussed, and the other assembly 4 is mounted adjacent the left rear corner 39. The left dispenser assembly 4 is mounted in the same manner as the right dispenser assembly 4 except in a mirror image fashion such that the left dispenser assembly 4 pivots from its stored position downwardly and to the left in contrast with the movement of the right dispenser assembly 4 moving downwardly and to the right. The dispenser cover for the left assembly 4 thus faces in the opposite direction with its side entrance opening being a left side entrance opening. Thus, when the left assembly 4 is in its forward dispensing position or an intermediate dispensing position, it extends outwardly to the left beyond left wall 38 the relationship of left dispenser assembly 4 relative to the various other components of vehicle 1, as should be evident from the previous description of such relationships with respect to the right dispenser assembly 4 with the exception of the movement and orientation of the left dispenser assembly 4 being in the opposite direction generally speaking.

As illustrated in FIG. 7, the use of the left and right dispenser assemblies not only increases the overall capacity for dispensing the liquid toppings due to the increased number of faucets 62, but also may increase the rate at which frozen confections 3 may be dispensed from within the kiosk especially in combination with an additional serving window 44 and corresponding panel 46. Thus, one or more workers inside the vehicle may simultaneously form and dispense frozen confections 3 for dispensing through the two service windows 44, thus creating two lines of customers represented by Arrows E, to increase the rate at which frozen confections 3 may be sold and dispensed through service windows 44 and also the rate at which customers may apply the toppings via the various faucets 62 of the left and right dispenser assemblies 4.

Figure 8:
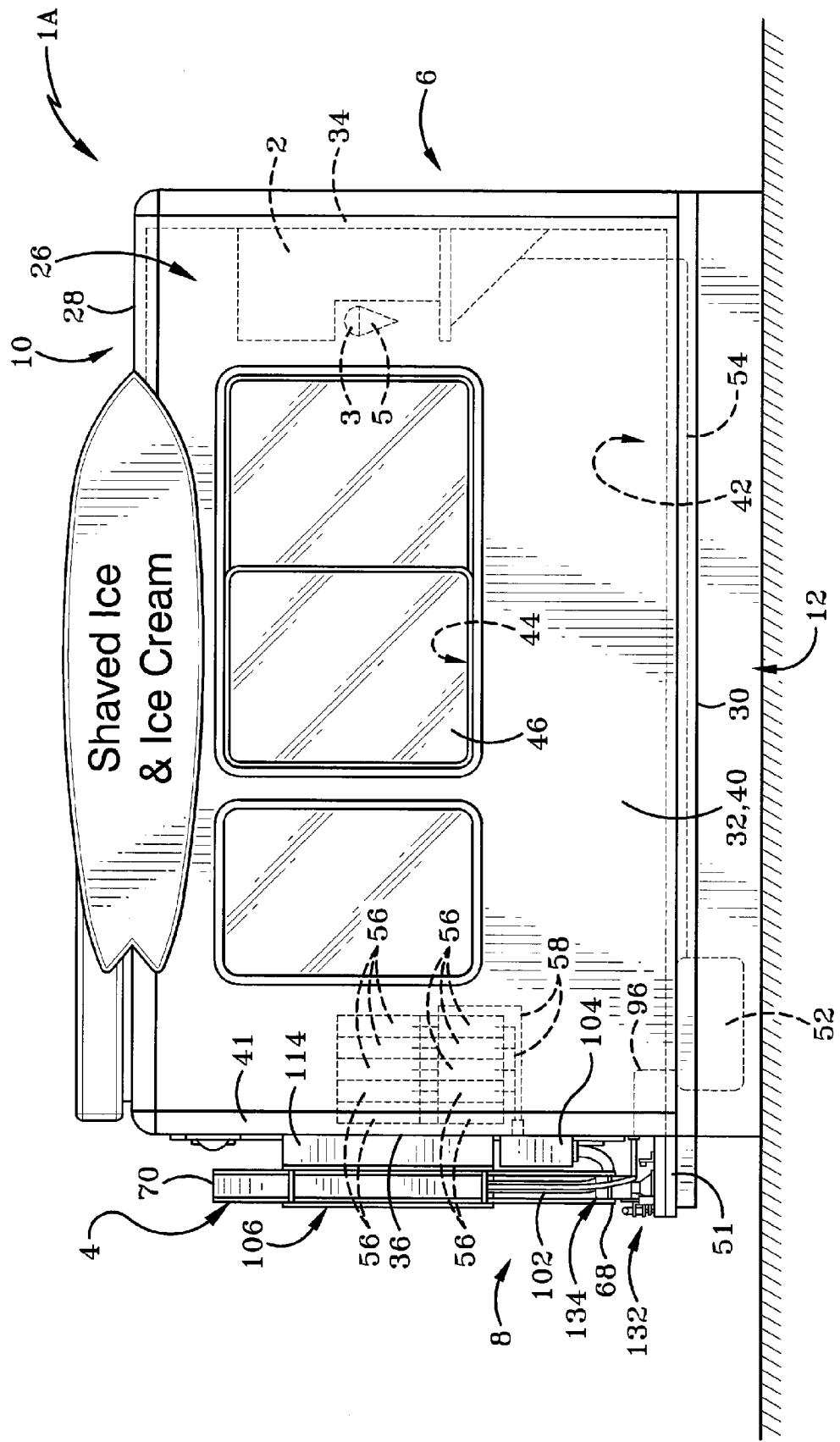
FIG. 8 is a side elevational view of a stationary kiosk using the dispenser assembly of the present invention.

FIG. 8 shows a kiosk 1A which is in the form of a stationary kiosk seated on the ground and having no wheels, or other basic components of vehicle 1, such as the cab or engine. Otherwise, kiosk 1A is substantially the same as the mobile kiosk 1 and thus includes a cargo or personnel box 26 with the confection forming device 2 and topping containers 56 within the interior chamber 42 thereof and dispenser assembly 4 mounted behind box 26 in the same manner as previously discussed. It is noted that although FIG. 8 shows dispenser assembly 4 mounted on a step 51 for purposes of simplicity, dispenser assembly 4 can also be mounted in a different manner, whether directly on side wall 32, or on a separate structure secured to the ground and/or box 26 external thereto. The operation of dispenser assembly 4 in FIG. 8 relative to kiosk 1A is the same as that described with respect to dispenser assembly 4 of FIG. 1 with respect to mobile kiosk 1, and thus is not described in further detail here.

Turning now to FIG. 9, mobile kiosk 1 is shown in use with a dispenser system in the form of a trailer 178. More particularly, mobile kiosk 1 serves as a towing vehicle and trailer 178 serves as a towed vehicle when hitched to vehicle 1. Trailer 178 includes a frame with typically a pair of wheels 18 rotatably mounted thereon to allow its rolling movement along the ground. Trailer 178 includes a cargo body or box 180, a tongue 181 extending forward therefrom and including a first hitch member 183 which is shown hitched to a second hitch member 185 secured to the rear end of the frame of vehicle 1. The hitch is shown particularly as a ball hitch wherein second hitch member 185 is a ball received within a socket of the female hitch member 183.

Box 180 has a front 182 and a back 184 defining therebetween a longitudinal direction, a top 186, a bottom 188, and left and right sides 190 and 192 defining therebetween an axial direction. Box 180 further includes a top wall 194 which includes a generally horizontal portion and an angled front portion extending forward and downwardly therefrom, a substantially horizontal bottom wall 196, and a vertical side wall 198. Side wall 198 includes a vertical front wall 200, a vertical back wall 202, a vertical left wall 204 and a vertical right wall 206. Walls 200, 202, 204 and 206 are joined in a manner that form four vertical corners, including right rear corner 208 which extends from adjacent bottom wall 196 to adjacent top wall 194. Top wall 194, bottom wall 196 and side wall 198 define therewithin an interior chamber 210 in which is disposed a plurality of topping containers 56 and portions of feed lines or hoses 158 each having an end connected to a respective container 56. Hoses 158 extend outwardly through an opening formed through a back wall 202 within box 104 and form a bundle 102 such that the opposite ends of hoses 58 are connected to faucets 62 (not shown in FIG. 9) as with the dispenser assemblies 4 and hoses 58 discussed previously. A door (not shown) is mounted on box 180 to allow access to the interior chamber 210 so that a person may install and remove containers 56 and other items as necessary.

One distinction between trailer 178 and vehicle 1 is that trailer 178 does not include a service window and is typically not configured to accommodate therein a person standing or sitting to work within interior chamber 210. Trailer 178 nonetheless provides the ability to increase the number of faucets 62 available for dispensing toppings onto frozen confections which are sold via vehicle 1 through the service window 44 thereof. The vehicle and trailer configuration shown in FIG. 9 thus provides at least two dispenser assemblies 4 with one of them mounted on the vehicle as previously discussed and the other mounted on the trailer in substantially the same manner. The relationship between dispenser assembly 4 in its stored orientation and its dispensing orientation is essentially the same with respect to box 180 as is the dispenser assembly 4 mounted on vehicle 1 with respect to box 26. Thus, for instance, the dispenser assembly 4 on trailer 178 is directly behind the back wall 202 in the stored position and extends outwardly beyond the right wall 206 in the forward dispensing position or intermediate dispensing position in the same manner and to the same degree as assembly 4 does with respect to box 26.

The use of trailer 178 with its dispenser assembly 4 thus not only increases the number of faucets 62 available for use when trailer 178 is used in conjunction with vehicle 1, but also allows for the possibility of using vehicle 1 without trailer 178 for specific circumstances in which an additional dispenser assembly 4 may not be needed and in which it may not be suitable to use trailer 178. However, if the additional capability is necessary, then trailer 178 can be hitched to vehicle 1 to that effect. The use of trailer 178 also allows the increase in the number of topping containers 56 without taking up additional space within the interior chamber of vehicle 1 by such additional topping containers 56. This leaves more space within vehicle 1 for the workers or other items without enlarging the size of the vehicle.

The present invention thus provides a kiosk, liquid topping dispenser assembly and methods of operation which provides substantial advantages in the art. As noted, the kiosk may be stationary or mobile and may utilize one or more dispenser assemblies external to the kiosk to substantially increase the rate at which frozen confections may be sold and distributed. One or more of the dispensers may be mounted on or adjacent the kiosk, to include the option of a dispenser mounted on a trailer. In addition, the dispenser assembly may be mounted between various dispensing positions to facilitate advertisements or attract the attention of potential customers, as well as facilitate the ability especially to use a mobile kiosk in various circumstances.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An apparatus comprising:
a kiosk comprising a sidewall defining an interior chamber having a size suitable for accommodating a person therein;
a frozen confection forming device in the interior chamber;
a serving window formed through the sidewall and configured to allow a frozen confection to pass through the window from the interior chamber to outside the kiosk;
a first liquid-topping dispenser assembly comprising a first support and a plurality of first liquid-dispensing faucets carried by the support; wherein the dispenser assembly is mounted adjacent and pivotable relative to the kiosk about a vertical axis and the faucets are positioned to be operable by a person outside the kiosk;
a vertical pivot assembly by which the dispenser assembly is pivotable about the vertical axis and by which the dispenser assembly is mounted on the kiosk in all positions of the dispenser assembly; and
a protective cover which is rigidly mounted on the sidewall and defines a cavity having an entrance opening;

wherein the dispenser assembly has a stored position in which the faucets are within the cavity of the cover and a dispensing position in which the faucets are outside the cavity of the cover; and the dispenser assembly is movable relative to the sidewall and cover through the entrance opening between the stored position and dispensing position;

wherein the faucets are outside the kiosk in all positions of the dispenser assembly.

2. The apparatus of claim 1 wherein the support is completely external to the sidewall in all positions of the dispenser assembly.

3. The apparatus of claim 1 wherein the dispenser assembly is pivotable about the vertical axis between first and second positions; and further comprising
 a releasable securing mechanism for releasably securing the dispenser assembly in the first and second positions.

4. The apparatus of claim 1 further comprising a drive mechanism operatively connected to the dispenser assembly for driving movement of the dispenser assembly.

5. The apparatus of claim 1 wherein the dispenser assembly is pivotable relative to the kiosk about a horizontal axis between the stored position and the dispensing position; the dispenser assembly has an inner end and a distal outer end; and when the dispenser assembly is in the dispensing position, the inner end of the dispenser assembly is adjacent the sidewall, the outer end of the dispenser assembly is distal the sidewall, the vertical axis is adjacent the inner end of the dispenser assembly and the horizontal axis is adjacent the inner end of the dispenser assembly.

6. The apparatus of claim 1 further comprising
 a plurality of liquid-topping containers within the interior chamber; and
 a plurality of hoses which are respectively in communication with the faucets and the containers.

7. The apparatus of claim 1 wherein the dispenser assembly is pivotable relative to the kiosk about a horizontal axis between a raised orientation and a lowered orientation; and further comprising
 a resistance mechanism operatively connected to the dispenser assembly to resist and thereby control movement of the dispenser assembly from the raised orientation to the lowered orientation.

8. The apparatus of claim 1 wherein the dispenser assembly is pivotable relative to the kiosk about a horizontal axis between a raised orientation and a lowered orientation; and further comprising
 a force producing mechanism operatively connected to the dispenser assembly and configured to apply a force on the dispenser assembly to facilitate movement of the dispenser assembly from the lowered orientation to the raised orientation.

9. The apparatus of claim 1 further comprising a gas spring operatively connected to the dispenser assembly.

10. The apparatus of claim 1 wherein the support has first and second opposed sides and defines an opening which is below the faucets and extends from the first side to the second side such that a frozen confection may pass entirely through the opening from the first side to the second side.

11. The apparatus of claim 10 further comprising:
 an upper arm of the support which is above the through opening and on which the faucets are mounted; and
 a lower arm of the support which is below the through opening and comprises a drain pan.

12. The apparatus of claim 1 further comprising
 a first end of the support adjacent the sidewall;
 an opposed second end of the support distal the sidewall;

wherein the plurality of faucets comprises a first faucet at a first horizontal distance from the first end and a second faucet at a second horizontal distance from the first end which is greater than the first horizontal distance.

13. The apparatus of claim 1 wherein the kiosk has front and back ends defining therebetween a longitudinal direction, and left and right sides defining therebetween an axial direction;
 the sidewall comprises a left wall, a right wall and a back wall; and
 the support extends (a) outwardly to the left beyond the left wall so that the faucets are to the left of the left wall and axially spaced from one another, or (b) outwardly to the right beyond the right wall so that the faucets are to the right of the right wall and axially spaced from one another, or (c) rearwardly beyond the back wall so that the faucets are rearward of the back wall and longitudinally spaced from one another.

14. The apparatus of claim 1 wherein the dispenser assembly is pivotable relative to the sidewall and cover about a horizontal axis between the stored position and dispensing position.

15. The apparatus of claim 1 wherein the support has inner and outer ends defining therebetween a length, a top and bottom defining therebetween a height which is no more than ½ of the length, and left and right substantially flat vertical sides defining therebetween a width which is no more than ⅓ of the height; the inner end is adjacent the sidewall; and the outer end is distal the sidewall.

16. The apparatus of claim 1 further comprising
 a first end of the support adjacent the sidewall;
 an opposed second end of the support distal the sidewall;
 first and second opposed sides of the support extending from the first end to the second end;
 a plurality of the faucets which are manually operable from the first side of the support; and
 a plurality of the faucets which are manually operable from the second side of the support.

17. The apparatus of claim 1 further comprising
 a first end of the support adjacent the sidewall;
 an opposed second end of the support distal the sidewall;
 first and second opposed sides of the support extending from the first end to the second end such that a vertical plane is disposed between and generally parallel to the first and second sides;
 a first plurality of the faucets on a first side of the vertical plane; and
 a second plurality of the faucets on an opposed second side of the vertical plane.

18. The apparatus of claim 1 further comprising
 a second liquid-topping dispenser assembly comprising a second support and a plurality of second liquid-dispensing faucets carried by the second support, wherein the second dispenser assembly is mounted adjacent the kiosk and the second faucets are positioned to be operable by a person outside the kiosk.

19. An apparatus comprising:
 a kiosk comprising a sidewall defining an interior chamber having a size suitable for accommodating a person therein;
 a frozen confection forming device in the interior chamber;
 a serving window formed through the sidewall and configured to allow a frozen confection to pass through the window from the interior chamber to outside the kiosk;
 a liquid-topping dispenser assembly comprising a support and a plurality of liquid-dispensing faucets carried by the support; wherein the dispenser assembly is mounted adjacent and pivotable relative to the kiosk about a first axis and a second axis which extends at an angle to the first axis, and the faucets are positioned to be operable by a person outside the kiosk;
a first pivot assembly which is external to the sidewall and by which the entire dispenser assembly is pivotable about the first axis;
a second pivot assembly which is external to the sidewall and by which the entire dispenser assembly is pivotable about the second axis; and
a dispenser mounting assembly which includes the first and second pivot assemblies and by which the dispenser assembly is mounted on the kiosk in all positions of the dispenser assembly;
a protective cover which is rigidly mounted on the sidewall and defines a cavity having an entrance opening: wherein the dispenser assembly has a stored position in which the faucets are within the cavity of the cover and a dispensing position in which the faucets are outside the cavity of the cover: and the dispenser assembly is movable relative to the sidewall and cover through the entrance opening between the stored position and dispensing position:
wherein the faucets are outside the kiosk in all positions of the dispenser assembly.

20. An apparatus comprising:
a kiosk having front and back ends defining therebetween a longitudinal direction, and left and right sides defining therebetween an axial direction; the kiosk comprising a sidewall defining an interior chamber having a size suitable for accommodating a person therein; the sidewall comprising a left wall, a right wall and a back wall;
a frozen confection forming device in the interior chamber;
a serving window formed through the sidewall and configured to allow a frozen confection to pass through the window from the interior chamber to outside the kiosk;
a liquid-topping dispenser assembly which is mounted on the kiosk and comprises a support and a plurality of liquid-dispensing faucets carried by the support;
wherein the dispenser assembly is movable between first and second positions; the support in the first position extends (a) outwardly to the left beyond the left wall so that the faucets are to the left of the left wall and axially spaced from one another, or (b) outwardly to the right beyond the right wall so that the faucets are to the right of the right wall and axially spaced from one another; and the support in the second position extends rearwardly beyond the back wall so that the faucets are rearward of the back wall and longitudinally spaced from one another;
a dispenser mounting assembly by which the dispenser assembly is mounted on the kiosk in all positions of the dispenser assembly; and
a protective cover which is rigidly mounted on the sidewall and defines a cavity having an entrance opening; wherein the dispenser assembly has a stored position in which the faucets are within the cavity of the cover and a dispensing position in which the faucets are outside the cavity of the cover; and the dispenser assembly is movable relative to the sidewall and cover through the entrance opening between the stored position and dispensing position;
wherein the faucets are outside the kiosk in all positions of the dispenser assembly.

21. The apparatus of claim 1 wherein the sidewall has a back wall;
the dispenser assembly is mounted adjacent the back wall;
the kiosk has a back door mounted on the back wall and pivotable between open and closed positions; and
the dispenser assembly is pivotable relative to the kiosk about the vertical axis external to the sidewall when the back door is in the closed position.

22. The apparatus of claim 19 wherein the sidewall has a back wall;
the dispenser assembly is mounted adjacent the back wall;
the kiosk has a back door mounted on the back wall and pivotable between open and closed positions; and
the dispenser assembly is pivotable relative to the kiosk about the first axis and the second axis external to the sidewall when the back door is in the closed position.

23. The apparatus of claim 20 wherein the dispenser assembly is mounted adjacent the back wall;
the kiosk has a back door mounted on the back wall and pivotable between open and closed positions; and
the dispenser assembly is movable between the first and second positions relative to the kiosk external to the sidewall when the back door is in the closed position.

24. The apparatus of claim 19 wherein the first pivot assembly is external to the sidewall; the dispenser assembly has a stored position and a dispensing position; the dispenser assembly has an inner end and a distal outer end; and when the dispenser assembly is in the dispensing position, the inner end of the dispenser assembly is adjacent the sidewall, the outer end of the dispenser assembly is distal the sidewall, the first axis is adjacent the inner end of the dispenser assembly and the second axis is adjacent the inner end of the dispenser assembly.

25. The apparatus of claim 1 wherein the sidewall includes a left wall, a right wall and a back wall having a bottom;
a back bumper is secured to a frame of the kiosk and extends rearwardly from adjacent the bottom of the back wall; and
the vertical pivot assembly is secured to and extends upwardly from the back bumper.

26. The apparatus of claim 19 wherein the sidewall includes a left wall, a right wall and a back wall having a bottom;
a back bumper is secured to a frame of the kiosk and extends rearwardly from adjacent the bottom of the back wall; and
the dispenser mounting assembly is secured to and extends upwardly from the back bumper.

27. The apparatus of claim 20 wherein the sidewall includes a left wall, a right wall and a back wall having a bottom;
a back bumper is secured to a frame of the kiosk and extends rearwardly from adjacent the bottom of the back wall; and
the dispenser mounting assembly is secured to and extends upwardly from the back bumper.

* * * * *